(12) United States Patent
Everette et al.

(10) Patent No.: US 12,487,838 B2
(45) Date of Patent: Dec. 2, 2025

(54) GRAPHICAL USER INTERFACE DESIGN RULE CONFORMANCE AND MEASURE OF USEABILITY SYSTEM

(71) Applicant: Taiwan Semiconductor Manufacturing Company, Ltd., Hsinchu (TW)

(72) Inventors: Neil Everette, Austin, TX (US); Willow Lafone, Durham, NC (US); Danielle Justilien, Morrisville, NC (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 183 days.

(21) Appl. No.: 18/300,172

(22) Filed: Apr. 13, 2023

(65) Prior Publication Data
US 2024/0345852 A1 Oct. 17, 2024

(51) Int. Cl.
*G06F 9/451* (2018.01)
*G06F 3/04847* (2022.01)
(Continued)

(52) U.S. Cl.
CPC .......... *G06F 9/451* (2018.02); *G06F 3/04847* (2013.01); *G06F 8/38* (2013.01); *G06F 18/00* (2023.01); *G06F 40/109* (2020.01)

(58) Field of Classification Search
None
See application file for complete search history.

(56) References Cited

U.S. PATENT DOCUMENTS 11,475,205 B2 * 10/2022 Lundin .................. G06F 9/451
2004/0193703 A1 * 9/2004 Loewy ................ H04L 41/0894
709/220

(Continued)

OTHER PUBLICATIONS

Giovanna et al., "Flexible Automatic Support for Web Accessibility Validation," Proceedings of the ACM Human-Computer Interaction, vol. 4, EICS, Article 83. Publication date: Jun. 2020, 24 pages. (Year: 2020).*

(Continued)

*Primary Examiner* — Irete F Ehichioya
(74) *Attorney, Agent, or Firm* — Harrity & Harrity, LLP

(57) ABSTRACT

Some implementations described herein provide apparatuses and techniques related to graphical user interface design conformance and useability. The apparatuses and techniques include a graphical user interface design management server including a graphical user interface design conformance and a measure of useability application. The graphical user interface design management server may receive one or more attribute changes related to a design of a graphical user interface. The graphical user interface design management server may then access a storage device containing graphical user interface design rules and determine a degree of conformance of a graphical user interface generated using the attribute changes to the graphical user interface design rules. Further, and using machine learning techniques, the graphical user interface design management server may determine one or more additional changes to the attributes that improve the measure of useability of the graphical user interface for anticipated users of the graphical user interface.

20 Claims, 14 Drawing Sheets

(51) Int. Cl.
*G06F 8/38* (2018.01)
*G06F 18/00* (2023.01)
*G06F 40/109* (2020.01)

(56) References Cited

U.S. PATENT DOCUMENTS

| | | | |
|---|---|---|---|
| 2006/0005156 A1* | 1/2006 | Korpipaa | G06F 1/1694 717/100 |
| 2015/0220312 A1 | 8/2015 | Jemiolo | |
| 2016/0092091 A1* | 3/2016 | Hanson | G06F 3/04886 715/763 |
| 2019/0102067 A1 | 4/2019 | Glasgow et al. | |
| 2019/0130606 A1 | 5/2019 | Walsh | |
| 2020/0117431 A1 | 4/2020 | Geva et al. | |

OTHER PUBLICATIONS

Lamm et al., "GCS: A Quick and Dirty Guideline Compliance Scale," Journal of Usability Studies, vol. 16, Issue 3, May 2021, pp. 179-202. (Year: 2021).*

"Material Theme Builder", downloaded from the Internet on Mar. 25, 2022, 1 page, <https://material-foundation.github.io/ material-theme-builder/#/custom>.

Mell et al., "The NIST Definition of Cloud Computing", Recommendations of the National Institute of Standards and Technology, NIST Special Publication 800-145, Sep. 2011, 7 pages.

* cited by examiner

GRAPHICAL USER INTERFACE DESIGN RULE CONFORMANCE AND MEASURE OF USEABILITY SYSTEM

BACKGROUND

A graphical user interface (GUI) is a form of user interface that allows users to interact with electronic devices. A web browser may provide a GUI that presents web pages. A user may navigate to a web page by entering a web address into an address bar of the web browser and/or by clicking a link displayed via another web page.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
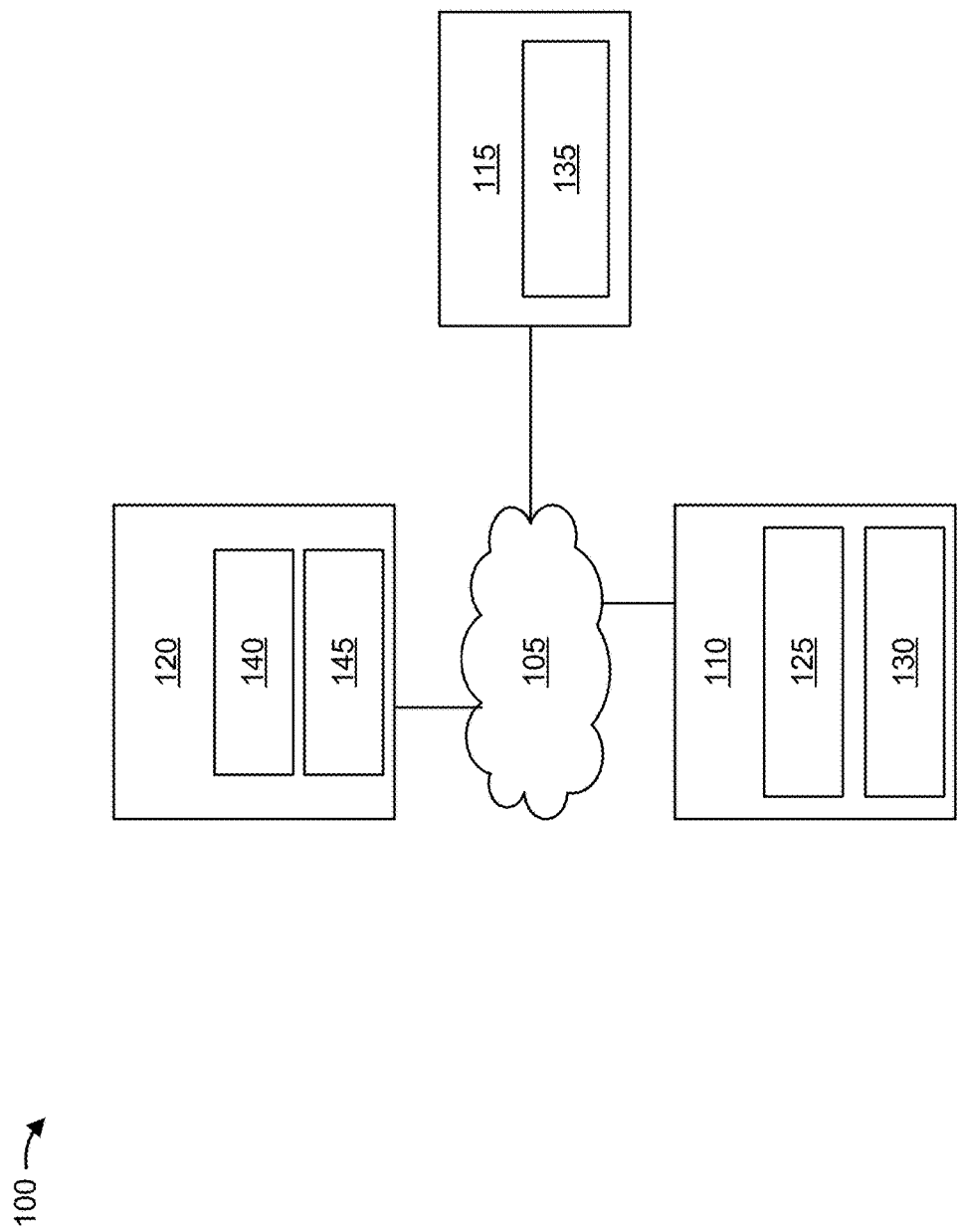
FIG. 1 is a diagram of an environment including example devices for generating a graphical user interface as described herein.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In some cases, a web page designer may interface with a graphical user interface (GUI) design application. Using the GUI design application, which may be web based, the web page designer may adjust one or more attributes related to a theme of a GUI being developed by the web page designer. The one or more attributes may be related to a color scheme, a visual text representation, and/or a background such as a pattern, among other examples. Adjusting the attributes may change a measure of useability of the GUI (e.g., a legibility, a navigability) for anticipated users of the GUI. However, adjusting the one or more attributes is often at the discretion of the web page designer, resulting in potential issues in the measure of useability of a particular web page design. As an example, the web page designer may change attributes related to a color of a text that causes the text to blend with a background of the GUI. If the web page designer is not familiar with GUI design guidelines, the web page designer may iterate on multiple GUI designs in an effort to generate a useable interface and cause a consumption of resources of a user device hosting a web design application and a server providing templates to the user device. Further, and in such a case, navigation and interpretation of the GUI by a user of a client device on which the GUI is presented may be slowed, causing idle time of the client device. Such idle time may cause a consumption of resources of the client device, resources of a server that serves the GUI to the client device, and resources of a network used for communications between the client device and the server.

Some implementations described herein provide apparatuses and techniques related to graphical user interface design conformance and useability. The apparatuses and techniques include a GUI design management server including a GUI design conformance and useability application. The GUI design management server may receive an input related to a design of a GUI, such as an image and one or more attributes related to the image. The GUI design management server may further receive another input including a set of GUI design rules and data related to anticipated users. Using the inputs, and in some cases a machine learning model, the design management server may generate one or more proposed GUIs having an increased degree in conformance to the GUI design rules and/or an increased measure of useability to the anticipated users of the GUI relative to GUI developed at the discretion of the web page designer.

In this way, a web page designer may efficiently design a GUI that is navigable and interpretable. In contrast to techniques relying on the web page designer designing the GUI at the web page designer's discretion, the apparatuses and techniques described herein may aid the web page designer to reduce a consumption of resources (e.g., computing resources and/or power resources) related to a user device and/or a server used to design the GUI. Additionally, or alternatively, because the GUI is designed with an increased degree in conformance to the GUI design rules and/or an increased measure of useability to the anticipated users of the GUI, the apparatuses described herein may reduce a consumption of resources related to a server that serves the GUI to a group of client devices, a network for communicating the GUI from the server to the group of client devices, and the group of client devices.

FIG. 1 is an environment 100 including example devices for generating a GUI described herein. The environment 100 includes a network 105, a user device 110, a GUI design management server 115, and a data source 120. The user device 110, the GUI design management server 115, and/or the data source 120 may be interconnected via the network 105.

The network 105 may include one or more wired and/or wireless networks. For example, the network 105 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 105 enables communication among the devices of FIG. 1.

The user device 110 may include one or more devices capable of receiving, generating, storing, processing, and/or providing information, related to designing or using a GUI as described elsewhere herein. The user device 110 may include a communication device and/or a computing device. For example, the user device 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 110 includes a user interface 125. The user interface may include a GUI that that allows users to interact with electronic devices, such as a computer keyboard and mouse, through graphical icons and visual indicators, such as secondary notation, as opposed to text-based interfaces, typed command labels, or text navigation. The user device 110 includes a processor and a memory (e.g., a non-transitory computer-readable medium (CRM)) that stores a GUI design application 130. In some implementations, the processor executes the GUI design application 130 and a user of the user device 110 inputs and/or alters attributes relating to a GUI design using the GUI design application 130.

The GUI design management server 115 may include one or more devices capable of receiving, generating, storing, processing, providing, and/or routing information related to GUI design rule conformance and measure of useability as described elsewhere herein. The GUI design management server 115 may include a communication device and/or a computing device. For example, the GUI design management server 115 may include a server, such as an application server, a client server, a web server, a database server, a host server, a proxy server, a virtual server (e.g., executing on computing hardware), or a server in a cloud computing system. In some implementations, the GUI design management server 115 may include computing hardware used in a cloud computing environment.

The GUI design management server 115 may further include one or more processors and one or more memories (e.g., one or more non-transitory CRMs), such as a memory that stores a GUI conformance and useability application 135. In some implementations, and as described in greater detail in connection with FIGS. 2A-7, the one or more processors, coupled to the one or more memories, are configured to receive an input including an image and a set of attributes associated with a GUI, receive an input including a set of GUI design rules, provide the set of GUI design rules to a machine learning model to train the machine learning model, and determine, using the machine learning model, a combination of changes to two or more individual attributes, of the set of attributes, to improve a measure of useability of a GUI including the image. In some implementations, the combination of changes is based on the set of GUI design rules. The one or more processors, coupled to the one or more memories, are further configured to generate a proposed graphical user interface (a proposed GUI) including the image based on the combination of changes to the two or more individual attributes, and provide an output including the proposed GUI and an indication of a degree of conformance of the proposed GUI to the set of GUI design rules. Further, and in some implementations, the one or more processors are further configured to determine a correlation between the measure of useability of the GUI and feedback received from a user and/or at least one characteristic of a demographic that is anticipated to use the GUI and provide information relating to the correlation to update the machine learning model (e.g., to improve an accuracy of the machine learning model).

Additionally, or alternatively, the GUI conformance and useability application 135, when executed by the one or more processors, may cause the GUI design management server 115 to perform one or more operations. For example, the GUI conformance and useability application 135, when executed by the one or more processors, may cause the GUI design management server 115 to receive an input including an image and a set of attributes associated with a GUI, receive an input including a set of GUI design rules, and determine multiple combinations of changes to two or more individual attributes, of the set of attributes, to improve a degree of conformance to the set of GUI design rules by a GUI including the image. The set of instructions, when executed by the one or more processors, further cause the GUI design management server 115 to generate multiple example GUIs including the image based on the multiple combinations of changes to the two or more individual attributes and provide an output including the multiple example GUIs including the image.

The data source 120 may include one or more devices capable of receiving, generating, storing, processing, and/or providing information associated with GUI design rule conformance and measure of useability described elsewhere herein. The data source 120 may include a communication device and/or a computing device. For example, the data source 120 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 120 may communicate with one or more other devices of environment 100, as described elsewhere herein.

In some implementations, the data source 120 may store GUI design rules 140 and/or user data 145. The GUI design rules 140 may correspond to accessibility guidelines (e.g., Web Content Accessibility Guidelines) that include design rules related a perceivability of a GUI (e.g., information and interface components that are perceivable to a user of the GUI). Design rules related to the perceivability of the GUI may include a minimum contrast guideline, an enhanced contrast guideline, a use of color guideline, a visual presentation guideline, and/or an orientation guideline, among other examples. Design rules related to the perceivability of the GUI may further include design rules related to an images of text guideline, a resize text guideline, and/or a non-text contrast guideline, among other examples.

Additionally, or alternatively, the GUI design rules 140 may include design rules related to a pattern grid that may be used in a background of a GUI. As an example, such design rules may include a spacing of a pattern grid, a rotation of the pattern grid, an opacity of the pattern grid, a gradient included in the pattern grid, and/or a direction of the gradient included in the pattern grid, among other examples.

Additionally, or alternatively, the GUI design rules 140 may include a mapping of attributes related to different conformance levels (e.g., thresholds, values, or conformance expectations). For example, and for a conformance level corresponding to a conformance expectation, a first attribute may be mapped to a "must satisfy" conformance level, a second attribute may be mapped to a "should satisfy" conformance level, and a third attribute may be mapped to a "may satisfy" conformance level. The "must satisfy" conformance level corresponds to a conformance level that must be satisfied. The "should satisfy" conformance level corresponds to a conformance level that it is recommended to be satisfied. The "may satisfy" conformance level corresponds to a conformance level that it is optional whether to satisfy.

In some implementations, the user data 145 includes characteristics of a demographic that is anticipated to use a GUI of a particular design. The user data 145 may include data sourced from user profiles stored on group of client devices that interface with one or more GUIs. In some implementations, the data is sourced with informed consent by users of the groups of client devices. The user profiles may be associated with different GUIs having different content, themes, and/or targeted audiences, among other examples. Additionally, or alternatively, the user data 145 may include data sourced from survey responses provided by the users of the group of client devices.

Examples of user data 145 may include one or more characteristics related to a demographic of the users of the group of client devices. Such characteristics may include ages of the users, education levels of the users, types of user devices used by the users, and/or geographic locations of the user devices, among other examples. Additionally, or alternatively, such characteristics may include physiological capabilities that are pertinent to interfacing with a GUI, such as a dexterity of the users and/or an eyesight of the users, among other examples.

The number and arrangement of devices shown in FIG. 1 are provided as one or more examples. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the example environment 100 may perform one or more functions described as being performed by another set of devices of the example environment 100.

FIGS. 2A-2E are diagrams of an example implementation 200 of generating a GUI as described herein. The example implementation 200 includes the user device 110, the GUI design management server 115, and the data source 120. The user device 110, the GUI design management server 115, and/or the data source 120 may be interconnected via the network 105.

Figure 2A:
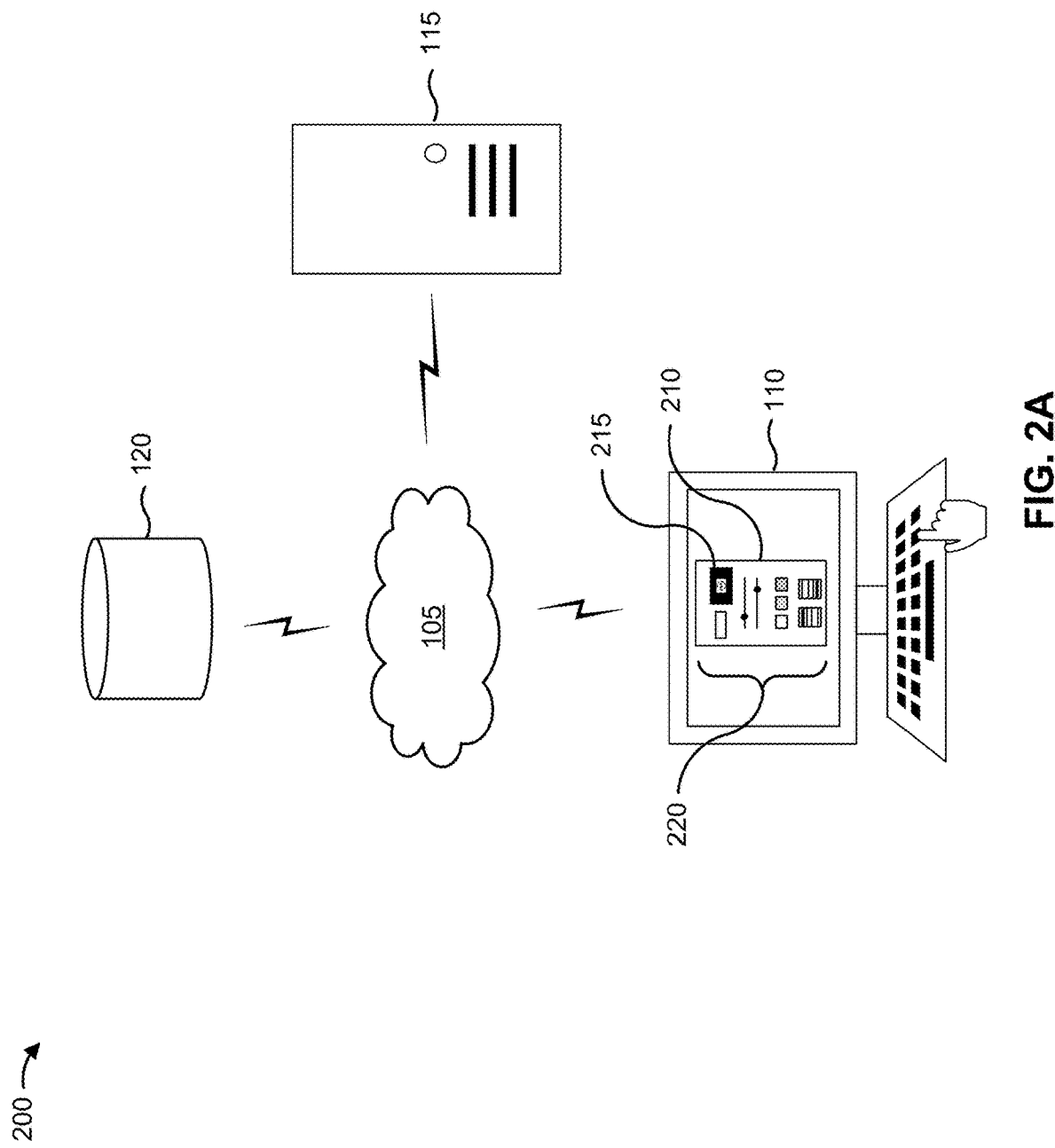
FIGS. 2A-2E are diagrams of an example implementation of generating a graphical user interface as described herein.

As shown in FIG. 2A, and as described in greater detail in connection with FIGS. 3A-7 and elsewhere herein, a user of the user device 110 may be interfacing with a GUI design menu 210 (e.g., a GUI design menu provided by the GUI design application 130). The GUI design menu 210 may interact with the GUI design management server 115. For example, the user may use the user device 110 to log into the GUI design management server 115 via the design application 130. Once logged into the GUI design management server 115 and via the GUI design menu 210, the user may have access to a plurality of templates of GUI designs and/or have access to computing resources of the GUI design management sever 115 to facilitate design of a GUI. The user may use the GUI design menu 210 to provide information to and to receive information from the GUI design management server 115.

Using the GUI design menu 210, the user may select a template of a GUI design and/or a demographic characteristic of anticipated users of a GUI. Further, the user may be able to select/provide an image 215 (a logo included in an image file, among other examples) and select/provide a set of two or more attributes 220 related to generating a GUI including the image (settings related to a color of the image 215 and/or a location of the image 215, among other examples).

Figure 2B:
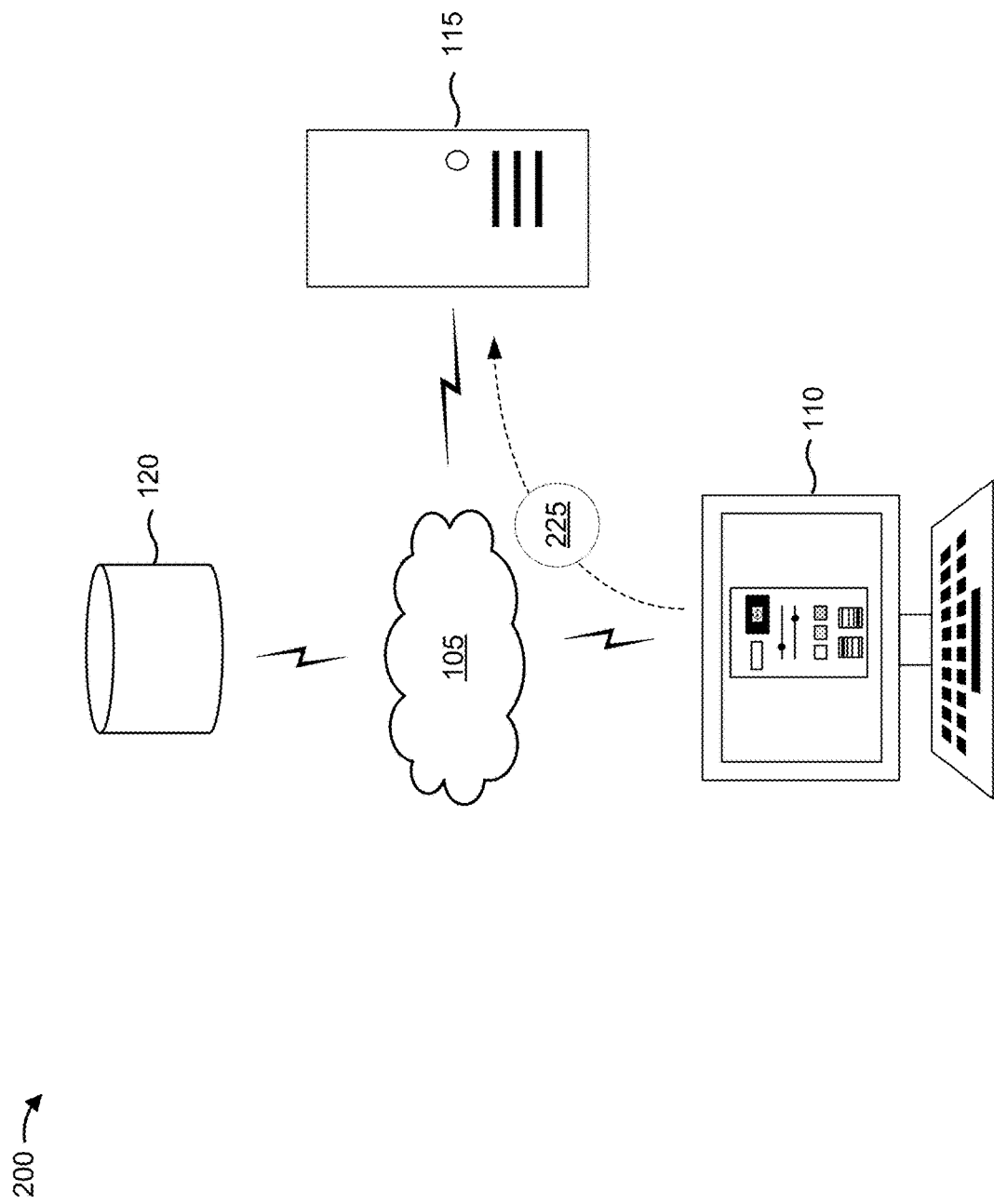

As shown in FIG. 2B, the user device 110 may provide and the GUI design management server 115 (e.g., the one or more processors of the GUI design management server 115 executing the GUI conformance and useability application 135) may receive, via the network 105, an input 225 that includes information identifying the selected template, the demographic characteristic, the image 215, and/or the set of two or more attributes 220. The GUI design management server 115 may interpret the input 225 as an instruction to design a GUI based on the selected template, the demographic characteristic, the image 215, and/or the set of two or more attributes 220. In some implementations, the GUI design management server 115 may select a template to use for the GUI based on the input 225, such as when the input 225 does not include information identifying a selected template. In these implementations, the GUI design management server 115 may select the template from a plurality of available templates based on a purpose of the GUI, the demographic characteristic, the image 215, and/or the set of two or more attributes 220.

Figure 2C:
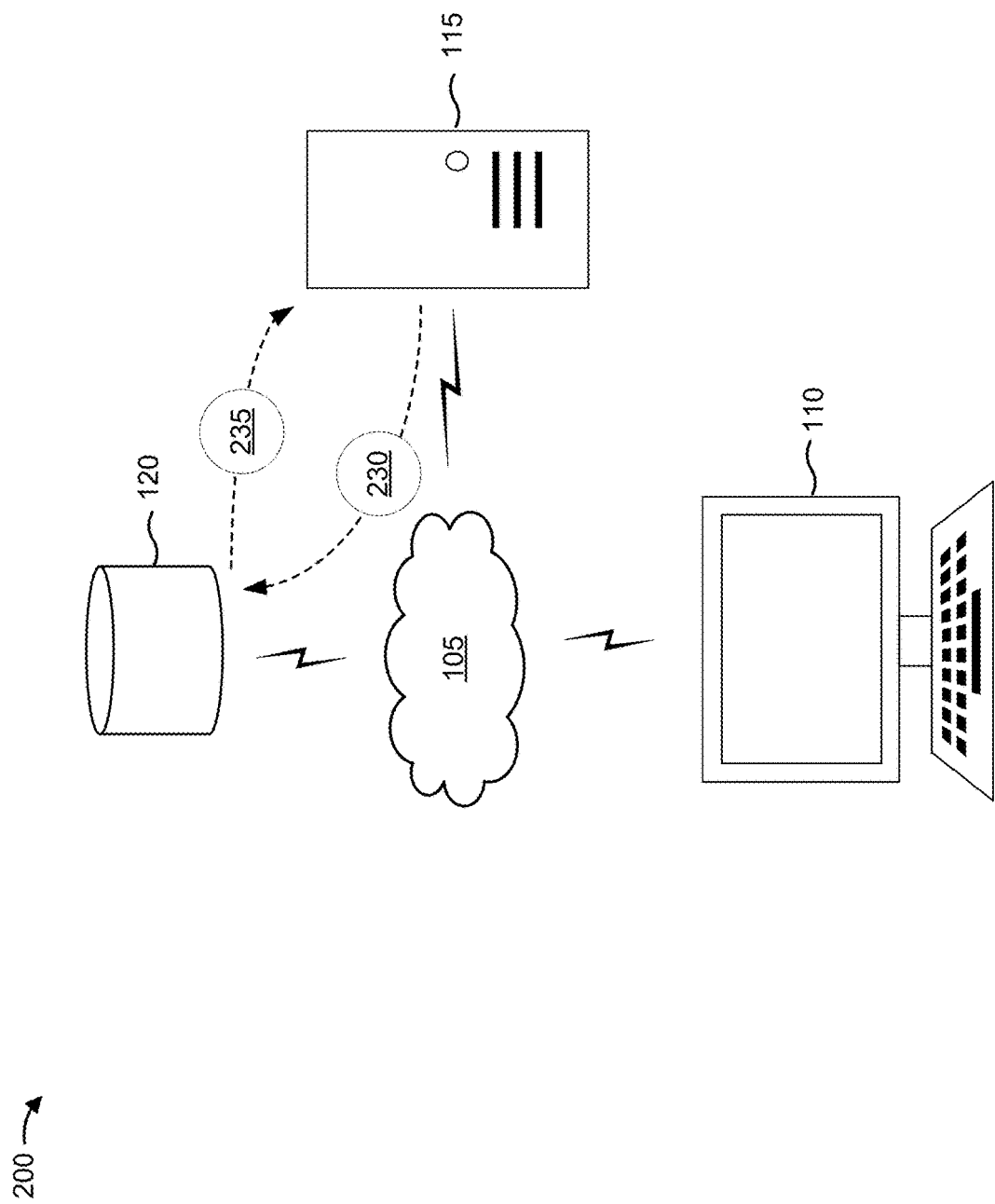

As shown in FIG. 2C, the GUI design management server 115 may provide, to the data source 120 via the network 105, an output 230 that includes a request for a set of GUI design rules (e.g., the GUI design rules 140). In some implementations, the request is based on an evaluation, by the GUI design management server 115, of the input 225. In some implementations, and based on the evaluation, the request may include a request for the set of GUI design rules, such as a specific set of GUI design rules (e.g., the Web Content Accessibility Guidelines), a portion of a specific set of GUI design rules, or a specific revision of a set of GUI design rules, among other examples. Further, the request may include a request for user data (e.g., the user data 145) related to the indication of the demographic characteristic.

In some implementations, the data source 120 is a third party provider of GUI design rules. In these implementations, the GUI design management server 115 may issue a request or use an application programming interface (API) to obtain the set of GUI design rules on the data source 120. In some implementations, the data source 120 is associated with the GUI design management server 115. In these implementations, the GUI design management server 115 may simply access or query the data source 120 to obtain the set of GUI design rules from the data source 120.

Further, as shown in FIG. 2C and based on the request 230, the data source 120 may provide and the GUI design management server 115 may receive, via the network 105, an input 235 including the set of GUI design rules and/or the user data related to the indication of the demographic characteristic. In some implementations, such as when the data source is a third party provider, the set of GUI design rules and/or the user data may be in a format that is not readily useable by the GUI design management server 115. In these implementations, the GUI design management server 115 may process the set of GUI design rules and/or the user data using data processing techniques, such as natural language processing, to convert, for example, unstructured data into structured data that may be readily useable by the GUI design management server 115.

Figure 2D:
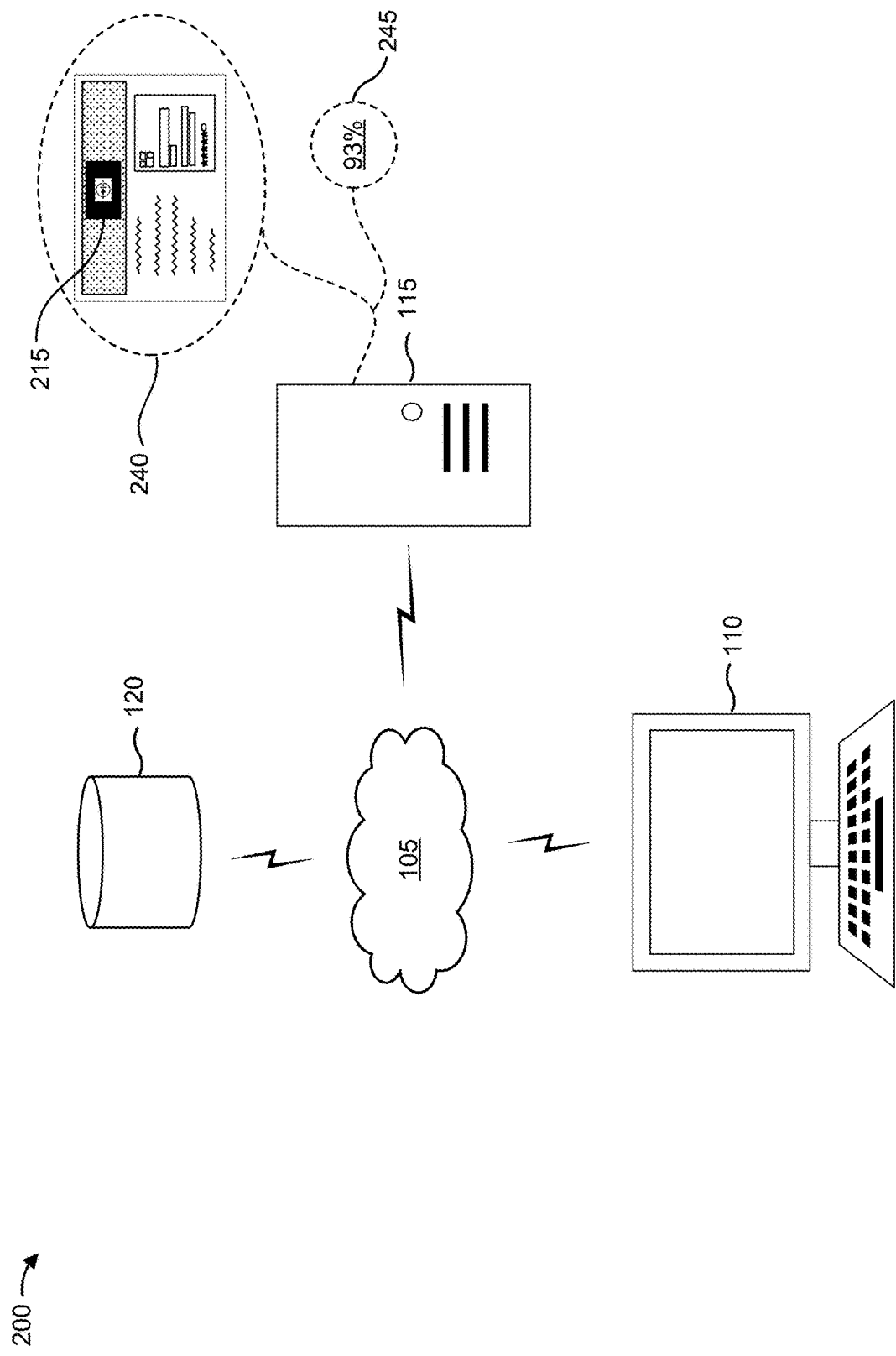

As shown in FIG. 2D, the GUI design management server 115 may determine and generate a proposed GUI 240 that includes the image 215. In some implementations, generating the proposed GUI 240 includes a series of operations that includes determining a baseline set of attributes and an improved set of attributes that, when used to the generate the GUI 240, increase a degree of conformance 245 or a measure of useability of the proposed GUI 240 over a baseline GUI generated using the baseline set of attributes. In these implementations, the GUI design management server 115 may generate a baseline GUI and a candidate GUI. A candidate GUI is a GUI that has a better degree of conformance 245 and/or a better measure of useability than the baseline GUI. A candidate GUI may correspond to the proposed GUI 240 in some situations.

For example, the GUI design management server 115 may generate the baseline GUI using the selected template (including default attributes of the selected template, which may include hundreds or thousands of attributes) in combination with the demographic characteristic, the image 215, and/or the set of two or more attributes 220 received via the input 235. The GUI design management server 115 server may then determine an associated degree of conformance for the baseline GUI in relation to the set of GUI design rules.

In some implementations, the GUI design management server 115 may determine the associated degree of conformance for the baseline GUI using a machine learning model. For example, the GUI design management server 115 may use a machine learning model that has been trained on the set of GUI design rules. The machine learning model may have been trained using historical data relating to GUIs and the set of GUI design rules. Using the example in which the conformance levels include a "must satisfy" conformance level, a "should satisfy" conformance level, and a "may satisfy" conformance level, for example, the machine learning model may use a weighting technique to account for these different conformance levels. For example, the "must satisfy" conformance level may have a higher weighting than the "should satisfy" conformance level, and the "should satisfy" conformance level may have a higher weighting than the "may satisfy" conformance level.

The machine learning model may be trained to receive, as input, information relating to a GUI (e.g., the baseline GUI, including the selected template in combination with the demographic characteristic, the image 215, and/or the set of two or more attributes 220) and may output a score that indicates a degree of conformance of the GUI to the set of GUI design rules. A higher score may indicate a higher degree of conformance to the set of GUI design rules than a lower score.

In some implementations, the GUI design management server 115 may train and use the machine learning model. In some implementations, another device may train the machine learning model and provide the machine learning model for use by the GUI design management server 115. In either case, the machine learning model may be periodically updated based on user feedback from the user of the user device 110. Updating the machine learning model based on the user feedback may improve the operation and output (e.g., an accuracy) of the machine learning model.

In some implementations, a first machine learning model may determine the degree of conformance of a GUI to the set of GUI design rules and a second machine learning model may determine the measure of useability of the GUI. The second machine learning model may have been trained on similar historical data as the first machine learning model except that the historical data used to train the second machine learning model may additionally include historical data relating to demographic characteristics of users and the impact of those demographic characteristics on the set of GUI design rules. In this case, the second machine learning model may output a score that indicates a measure of useability of the GUI relative to the demographic characteristics of anticipated users of the GUI.

In some implementations, a same machine learning model may determine the degree of conformance of a GUI to the set of GUI design rules and the measure of useability of the GUI. The machine learning model may have been trained using a combination of the historical data described above. In this case, the machine learning model may output a score that indicates both a degree of conformance of the GUI to the set of GUI design rules and a measure of useability of the GUI relative to the demographic characteristics of anticipated users of the GUI.

Figure 4:
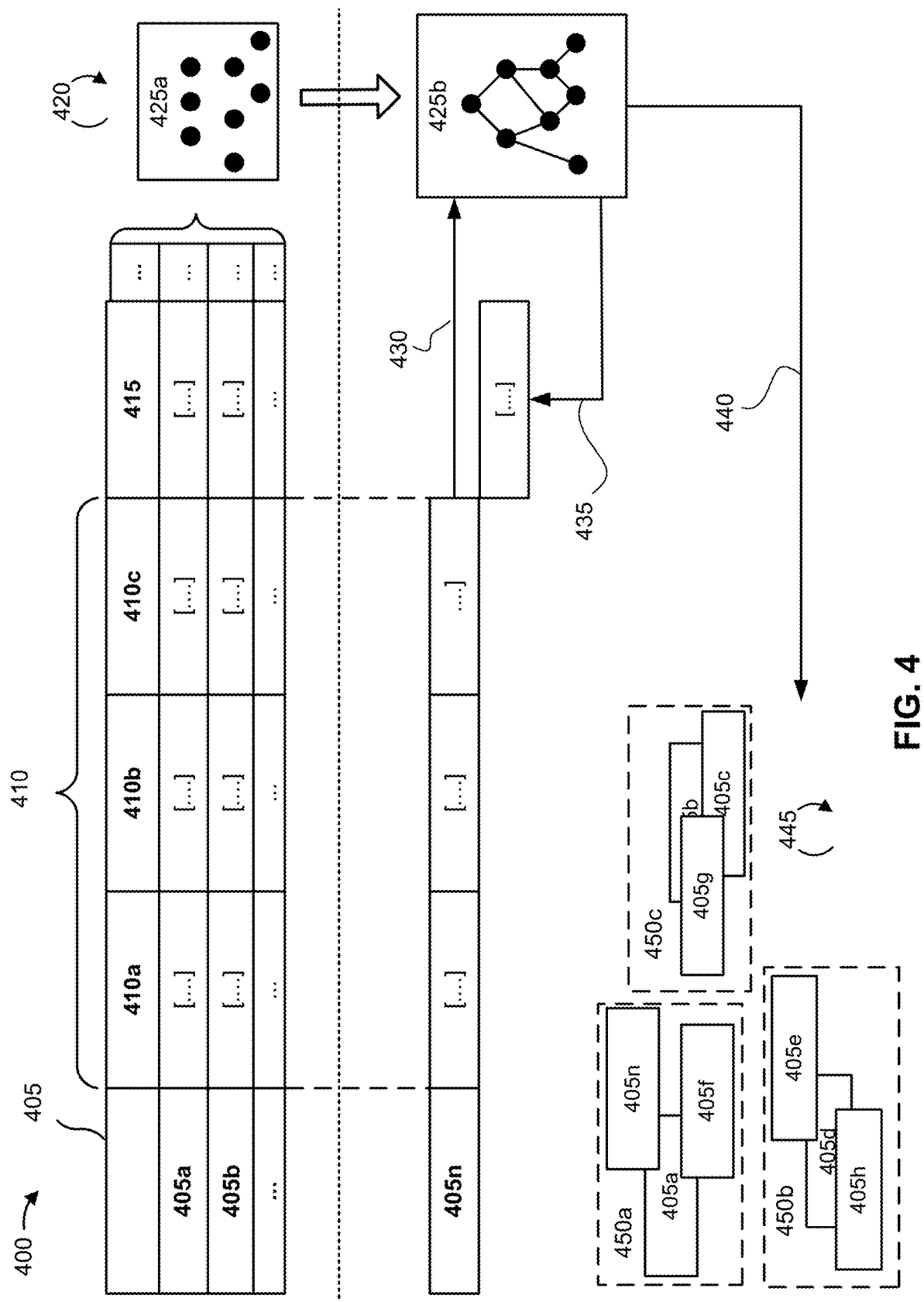
FIG. 4 is a diagram illustrating an example of training and using a machine learning model in connection with generating a graphical user interface as described herein.

Further details regarding the machine learning model are provided in connection with FIG. 4.

As another example for determining the associated degree of conformance for the baseline GUI, the GUI design management server 115 may use a conformance level weighting process. For example, through visual and/or textual analysis of the baseline GUI, assume that the GUI design management server 115 identifies a first set of attributes that are present and relevant to the "must satisfy" conformance level, a second set of attributes that are present and relevant to the "should satisfy" conformance level, and a third set of attributes that are present and relevant to the "may satisfy" conformance level. In practice, a GUI may have hundreds or thousands of attributes.

The GUI design management server 115 may assess an available conformance value of X points to each of the first set of attributes satisfy the "must satisfy" conformance level, an available conformance value of Y points to each of the second set of attributes that satisfy the "should satisfy" conformance level, and an available conformance value of Z points to each of the third set of attributes satisfy the "may satisfy" conformance level. In such an example, the total available conformance points are determined from a combination of: (1) a quantity of attributes in the first set of attributes times X points, (2) a quantity of attributes in the second set of attributes times Y points, and (3) a quantity of attributes in the third set of attributes times Z points. Assume, for this example, that this total available conformance points equal 45 points.

Further, and continuing with the example, the GUI design management server 115 may determine a quantity of attributes in the first set of attributes that satisfy the "must satisfy" conformance level, a quantity of attributes in the second set of attributes that satisfy the "should satisfy" conformance level, and a quantity of attributes in the third set of attributes that satisfy the "may satisfy" conformance level. The GUI design management server 115 may then determine the total conformance points for the baseline GUI as a combination of: (1) the quantity of attributes in the first set of attributes that satisfy the "must satisfy" conformance level times X points, (2) the quantity of attributes in the second set of attributes that satisfy the "should satisfy" conformance level times Y points, and (3) the quantity of attributes in the third set of attributes that satisfy the "may satisfy" conformance level times Z points. Assume, for this example, that this total conformance points equal 33 points.

The GUI design management server 115 may then determine the degree of conformance of the baseline GUI as a ratio of total conformance points to total available conformance points (e.g., 33/45=approximately 73%).

The GUI design management server 115 may generate a candidate GUI. As mentioned above, a candidate GUI may be a GUI that has a better degree of conformance 245 and/or a better measure of useability than the baseline GUI. To generate the candidate GUI, the GUI design management server 115 may select a combination of attributes to change to improve the degree of conformance 245 and/or the measure of useability. For example, the GUI design management server 115 may select one or more attributes associated with the "must satisfy" conformance level that are not satisfied by the baseline GUI, may select one or more attributes associated with the "should satisfy" conformance level that are not satisfied by the baseline GUI, and/or may select one or more attributes associated with the "may satisfy" conformance level that are not satisfied by the baseline GUI. When selecting the combination of attributes, the GUI design management server 115 may select from hundreds or thousands of attributes. In some implementations, the GUI design management server 115 may perform statistical modeling, such as regression analysis, to select the combination of attributes. The GUI design management server 115 may then change settings of the combination of attributes (e.g., change a combination of values related to a scale, an opacity, a contrast, and/or a background pattern, among other examples) in accordance with the set of GUI design rules.

The GUI design management server 115 may generate the candidate GUI (using an updated set of attributes including the combination of changed attributes). In other words, the candidate GUI may include the attributes associated with the baseline GUI along with the combination of changed attributes.

After generating the candidate GUI, the GUI design management server 115 may determine an associated degree of conformance for the candidate GUI using a machine learning model or a conformance level weighting process, as described above. If using the machine learning model, the GUI design management server 115 may input information relating to the candidate GUI (e.g., in combination with the demographic characteristic, the image 215, and/or the set of two more attributes 220) and may receive, as output, a score that indicates a degree of conformance of the candidate GUI to the set of GUI design rules. If using the conformance level weighting process, assume that total available conformance points are still 45 points as in the example above. In this case, because of the combination of changed attributes, assume that the candidate GUI has total conformance points of 42 points. In this case, the GUI design management server 115 may then determine the degree of conformance of the candidate GUI as a ratio of the total conformance points to the total available conformance points (e.g., 42/45=approximately 93%).

The GUI design management server 115 may repeat the above operations one or more times to generate one or more additional candidate GUIs. For each of these one or more additional candidate GUIs, the design management server 115 may determine an associated degree of conformance for each of these one or more additional candidate GUIs using a machine learning model or a conformance level weighting process, as described above.

In some implementations, and as part determining and generating the candidate GUI(s), one or more attributes may be interrelated (e.g., increasing a conformance of one attribute to the GUI design rules may decrease a conformance of another attribute to the GUI design rules). In these implementations, the GUI design management server 115 (e.g., the one or more processors executing the GUI design and conformance application 130) may use convergence techniques to determine an improvement in conformance.

The GUI design management server 115 may select the candidate GUI and/or one or more of the additional candidate GUIs as the proposed GUI 240. For example, the GUI design management server 115 may select a candidate GUI, from among the candidate GUI and/or the one or more additional candidate GUIs, with a highest degree of conformance as the proposed GUI 240. In some implementations, the GUI design management server 115 may select a candidate GUI, from among the candidate GUI and/or the one or more additional candidate GUIs, with a greatest measure of useability as the proposed GUI 240. In some implementations, the GUI design management server 115 may select a plurality of candidate GUIs, from among the candidate GUI and/or the one or more additional candidate GUIs, with highest degrees of conformance and/or with greatest measures of useability as the proposed GUI 240.

Figure 2E:
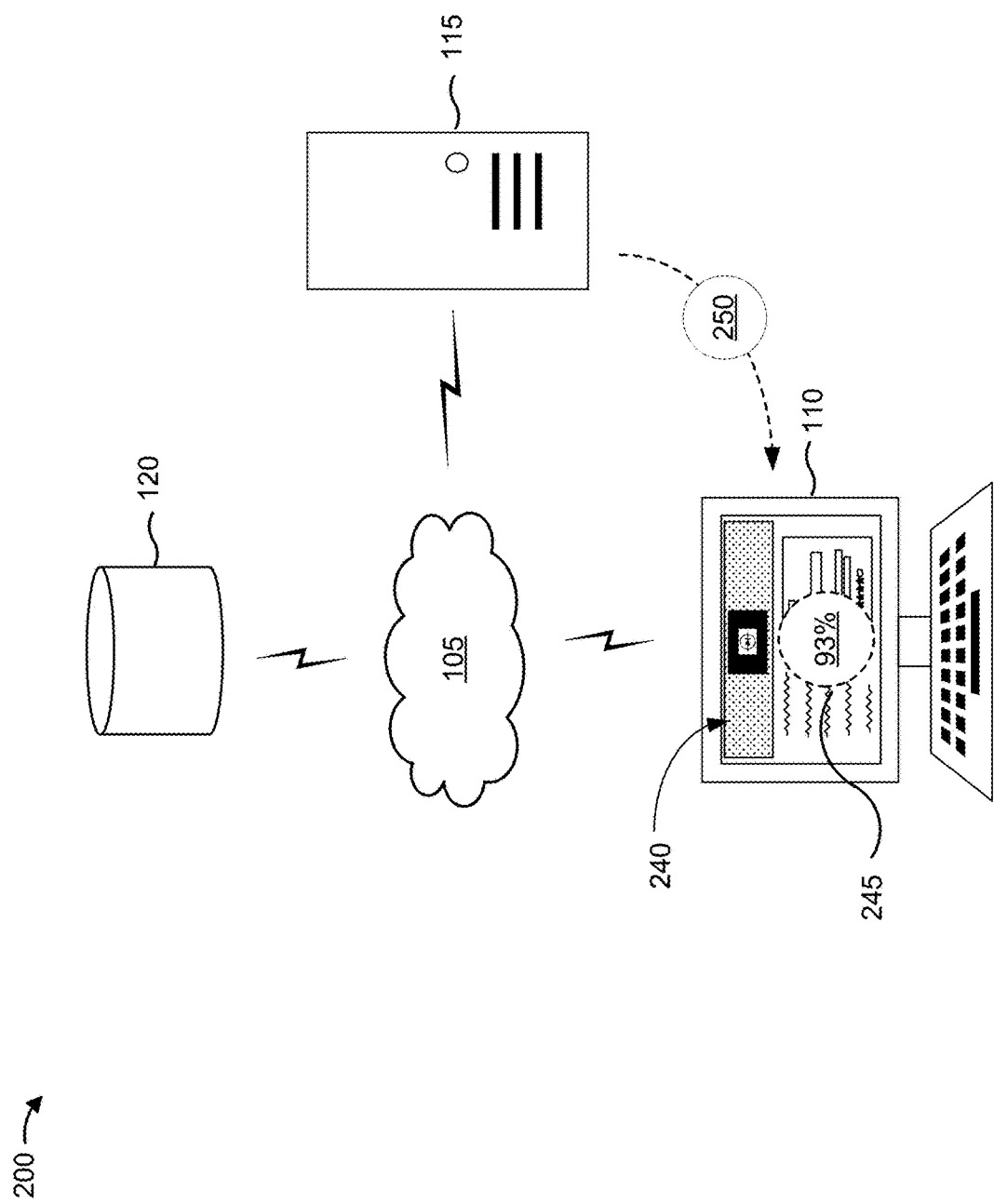

As shown in FIG. 2E, the GUI design management server 115 may then provide, to the user device 110 for presentation by the user device 110, an output 250 including the proposed GUI 240 and/or an indication of the degree of conformance 245.

In some implementations, GUI design management server 115 may determine multiple combinations of changes to two or more individual attributes, of the set of attributes 220, to improve a degree of conformance to the set of GUI design rules by the proposed GUI 240. In such a case, the GUI design management server 115 may generate multiple proposed GUIs (e.g., multiples of the proposed GUI 240), based on the multiple combinations of changes to the two or more individual attributes, and include the multiple proposed GUIs as part of the output 250. Additionally, or alternatively and in such a case, the GUI design management server 115 may determine a ranking of the multiple proposed GUIs based on a degree of conformance (e.g., the degree of conformance 245) of each of the multiple proposed GUIs to the set of GUI design rules. The GUI design management server 115 may further include the multiple proposed GUIs in the output 250, where the multiple proposed GUIs are included in a sequence corresponding to the ranking.

Further, and in such a case, the GUI design management server 115 may receive another input including an indication of a selected proposed GUI (a selected proposed GUI), from the multiple proposed GUIs, and a change to an attribute of the selected proposed GUI. The GUI design management server 115 may further generate an updated proposed GUI based on the change to the attribute and determine a change in a degree of conformance (e.g., the degree of conformance 245) to the set of GUI design rules. The GUI design management server 115 may then provide, to the user device 110, another output including the updated proposed GUI and an indication of the change in the degree of conformance. In other words, the GUI design management server 115 may repeat the operations described above based on feedback received from the user device 110. In some implementations, the GUI design management server 115 (or another device) may use the feedback to update the machine learning model described above.

As indicated above, FIGS. 2A-2E are provided as an example. Other examples may differ from what is described with regard to FIGS. 2A-2E.

FIGS. 3A-3D are diagrams associated with an example implementation 300 of generating a GUI to conform with design rules. In some implementations, the GUI correspond to the proposed GUI 240 designed to conform with the GUI design rules 250.

Figure 3A:
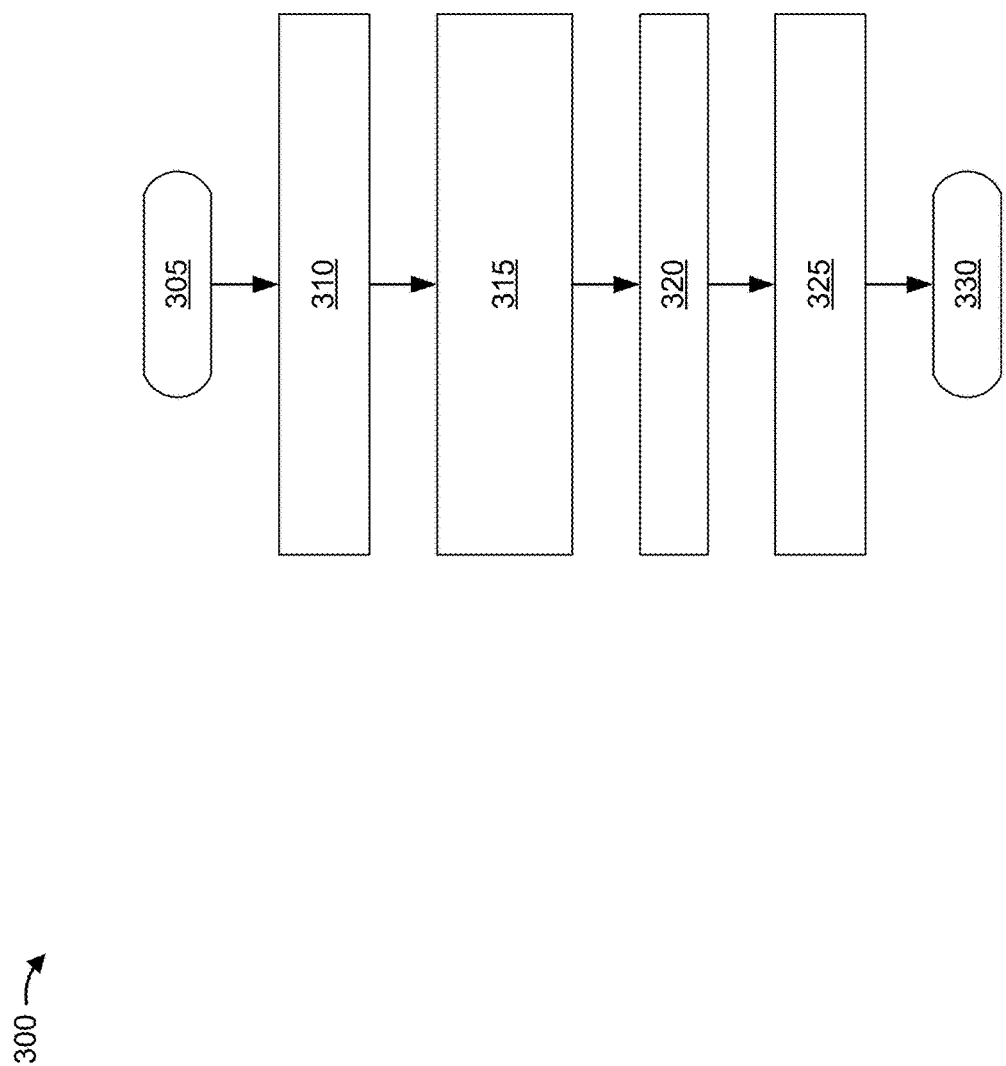
FIGS. 3A-3D are diagrams of details associated with an example implementation of generating a graphical user interface as described herein.

FIG. 3A shows steps that may be performed by the GUI design management server 115 (e.g., the one or more processors executing the GUI conformance and useability application 135) After beginning a series of steps at step 305, the GUI design management server 115, at step 310, receives an input 225 including the image 215 and the attribute 220. As an example, and in some implementations, the input includes a logo and a color.

At step 315, the GUI design management server 115 may determine one or more rules based on the received input 225. In some implementations, and as part of determining the one or more rules, the GUI design management server 115 selects one or more rules from the GUI design rules 140.

At step 320, the GUI design management server 115 generates the proposed GUI 240 including a background having a pattern (e.g., a background pattern, or a background pattern grid). In some implementations, the pattern includes a scale, a spacing, a rotation, and/or opacity determined based on the GUI design rules 140. In some implementations, a position of the image 215 within the pattern, a gradient direction within the pattern, and/or a style of a gradient within the pattern is based on the image 215 and the GUI design rules 140. In some implementations, the GUI design management server 115 receives additional inputs that may include changes to one or more attribute settings of the image 215 and/or the pattern. In some implementations, the GUI design management server 115 determines a theme based on the image 215 and/or the attribute 220. In some implementations, the GUI management server determines the degree of conformance 245 of the proposed GUI 240.

At step 325, GUI design management server 115 provides the output 250 including proposed GUI 240. In some implementations, the output 250 includes an indication of the degree of conformance 245. The GUI design management server 115 may further, at step 325, store one or more attributes related to a theme, a font, a pattern, and/or a logo included in the proposed GUI 240. The series of steps may conclude with step 330.

Figure 3B:
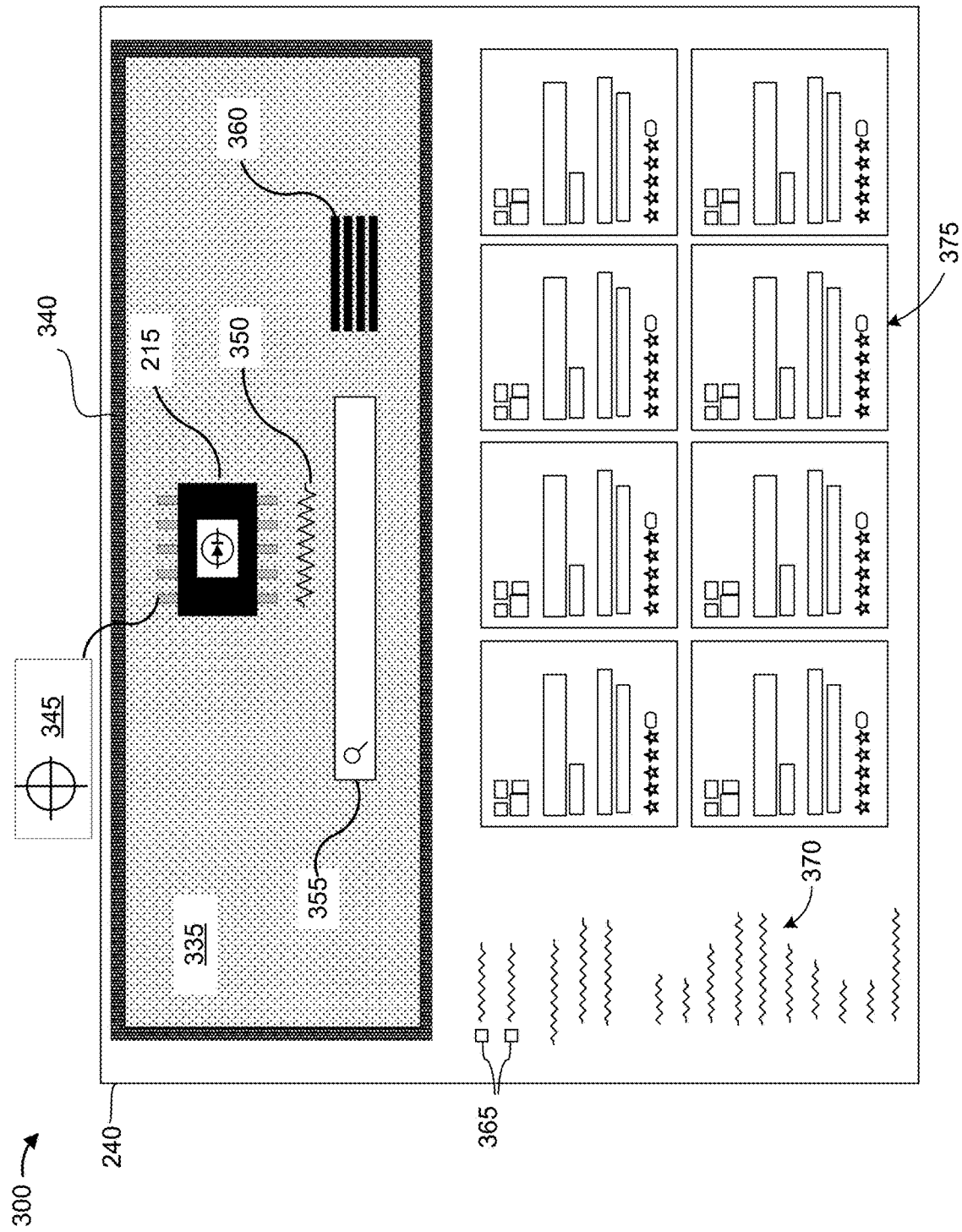

FIG. 3B shows details of a proposed GUI interface. The proposed GUI interface of FIG. 3B may correspond to the proposed GUI 240.

The proposed GUI 240 includes the image 215 over a background 335, where the background is surrounded by a border 340. The image 215 may be scaled to a size and have a position 345 within the background 335. In some implementations, text 350 may be included over the background 335.

In some implementations, a theme of the proposed GUI 240 may include a combination attributes used to generate the proposed GUI 240. For example, a theme may include a combination of attributes related to a color and/or pattern scheme of the background 335, a color and/or pattern scheme of the border 340, the position 345 of the image 215 within the background 335, and/or a color and/or font size of the text 350.

In some implementations, and as shown in FIG. 3B, the proposed GUI 240 includes additional features such as a search bar 355, a drop down menu 360, and/or selectable buttons 365. Additionally, or alternatively and as shown in FIG. 3B, the proposed GUI 240 may include navigable/selectable text 370 and/or data 375.

Figure 3C:
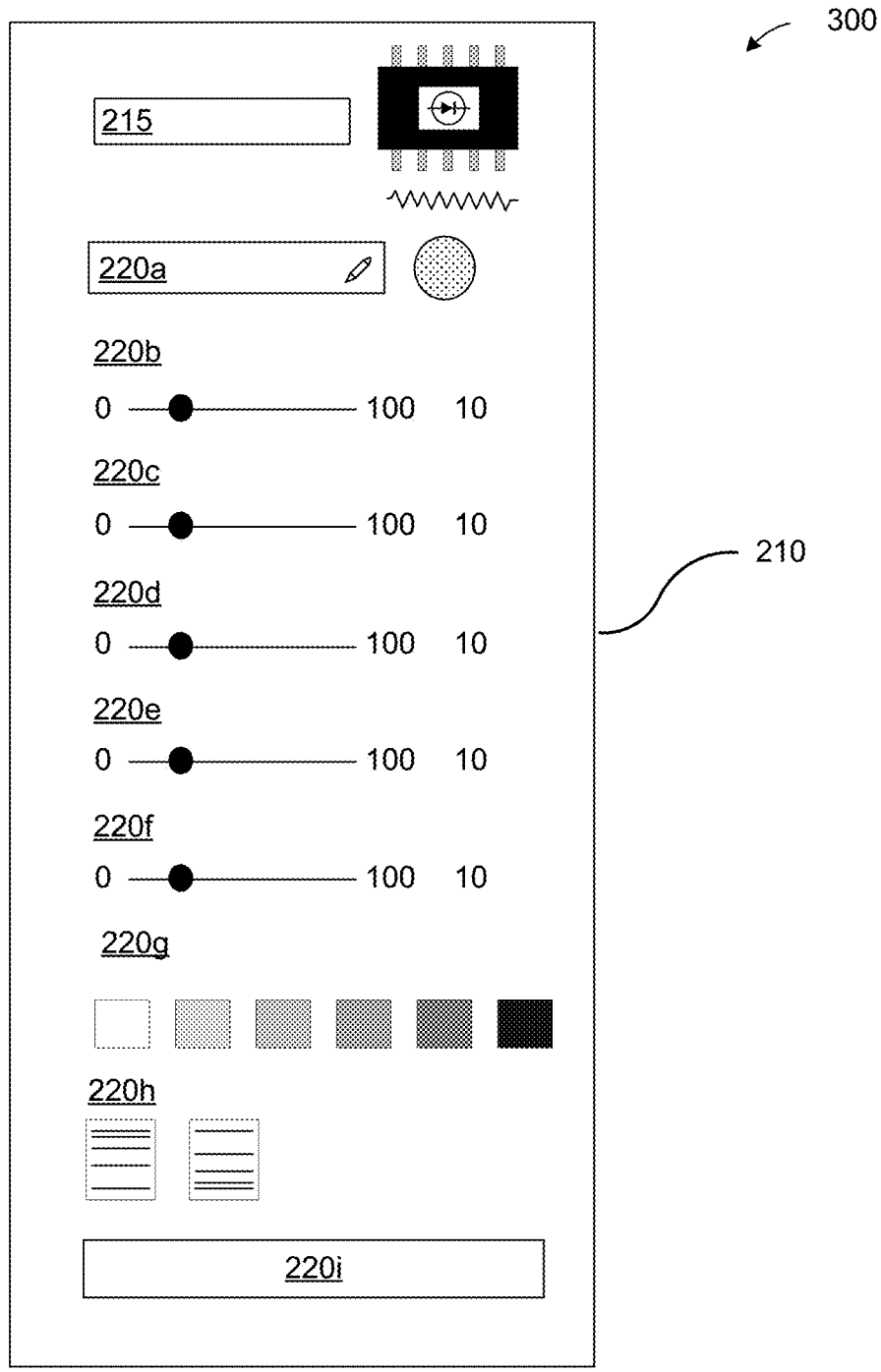

FIG. 3C shows an example of a GUI design menu. In some implementations, the GUI design menu corresponds to the GUI design menu 210.

Using the GUI design menu 210, the user may input a path to an image (e.g., a path to a file containing the image 215 stored on the user device 110) to be included in a GUI (e.g., the proposed GUI 240).

In some implementations, the user may adjust one or more settings related to an attribute (e.g., the attribute 220) used to generate the proposed GUI 240. The attribute may be related to the image 215, the background 335, the border 340, and/or the text 350, among other examples. For example, after receiving the proposed GUI 240, the user may adjust a setting related to a color attribute 220a, a scale attribute 220b, a spacing attribute 220c, a rotation attribute 220d, an opacity attribute 220e, or a position attribute 220f, among other examples. The user may further adjust a setting related to an intensity attribute 220g, a gradient attribute 220h (e.g., a gradient style or direction), and/or a theme attribute 220i.

Figure 3D:
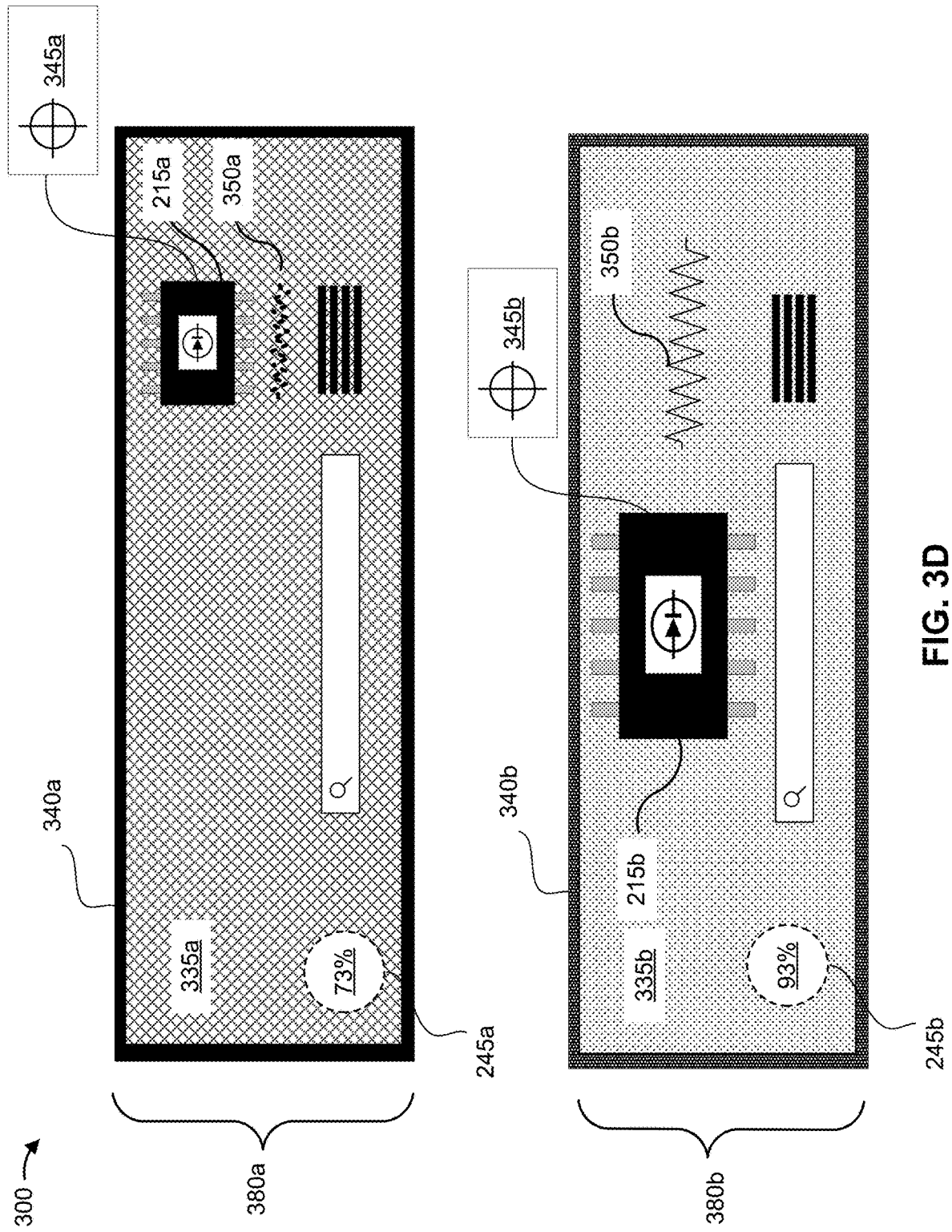

FIG. 3D shows examples of differences in themes that may be included in a GUI (e.g., the proposed GUI 240). In FIG. 3D, a theme 380a may correspond to a theme available through an open-source GUI design. Further, in FIG. 3D, a theme 380b may correspond to a theme determined by the GUI design management server 115.

As shown in FIG. 3D, the image 215a and the image 215b have different scales. Additionally, or alternatively and as shown in FIG. 3D, the location 345a of the image 215a and the location 345b of the image 215b are different. Additionally, or alternatively and as shown in FIG. 3D, the background 335a and the background 335b have different patterns and color schemes. Additionally, or alternatively and as shown in FIG. 3D, the border 340a and the border 340b have a different patterns and color schemes. Additionally, or alternatively and as shown in FIG. 3D, the text 350a and the text 350b have different font sizes and/or colors.

In some implementations and using techniques described herein, the GUI design management server 115 may determine that a degree of conformance to a set of GUI design rules (e.g., the GUI design rules 140) by a GUI using the theme 380a, is approximately 73%. Additionally, or alternatively and using techniques described herein, the GUI design management server 115 may determine a combination of changes to two or more individual attributes, of a set of attributes, that improves a degree of conformance to the set of GUI design rules to approximately 93% (e.g., determine the theme 380b having the degree of conformance of approximately 93%).

In some implementations, and using techniques described in connection with FIGS. 1-3D, a device (e.g., the GUI design management server 115) may perform a series of operations. The series of operations may include receiving, by the device, an input (e.g., the input 225) including an image (e.g., the image 215) and a set of attributes (e.g., the attributes 220) associated with a GUI. The series of operations includes receiving, by the device, an input (e.g., the input 235) including a set of GUI design rules (e.g., the GUI design rules 140). The method includes determining, by the device, a combination of changes to two or more individual attributes, of the set of attributes, that improves a degree of conformance (e.g., the degree of conformance 245) to the set of GUI design rules by a GUI including the image. The method includes generating, by the device, a proposed GUI (e.g., the proposed GUI 240) including the image based on the combination of changes to the two or more individual attributes. The method includes providing, by the device, an output (e.g., the output 250) including the proposed GUI and an indication of the degree of conformance of the proposed GUI to the set of GUI design rules.

In this way, a degree of conformance of a GUI to the GUI design rules, and a measure of useability of the GUI by anticipated users, may be increased relative to a GUI designed at the discretion of a web page designer. By increasing the degree of conformance and the measure of useability of the GUI, the anticipated users of the GUI may more easily interpret the GUI and navigate the GUI as presented across a group of client devices. As such, a utilization of the group of client devices may increase for a given period of time to reduce a use of computing resources and/or power consumed across the group of client devices.

FIG. 4 is a diagram illustrating an example 400 of training and using a machine learning model in connection with generating a GUI. The machine learning model training and usage described herein may be performed using a machine learning system. The machine learning system may include or may be included in a computing device, a server, a cloud computing environment, or the like, such as the GUI design management server 115 described in more detail elsewhere herein.

As shown by reference number 405, the machine learning model may be trained using a set of observations. The set of observations may be obtained from training data (e.g., historical data), such as data gathered during one or more processes described herein. In some implementations, the machine learning system may receive the set of observations (e.g., as input) from a user device, as described elsewhere herein.

As shown by reference number 410, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device 110. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature relating to a set of GUI design rules and a second feature relating to an anticipated user of a GUI. These features and feature values are provided as examples, and may differ in other examples. For example, the feature set may include a threshold, a value, and/or an attribute associated with one or more of the following features: a conformance level, a pattern guideline, a gradient guideline, a scaling guideline, a position guideline, a minimum contrast guideline, an enhanced contrast guideline, a use of color guideline, a visual presentation guideline, an images of text guideline, a resize text guideline, a non-text guideline, a scale of a pattern grid, a spacing of a pattern grid, a rotation of a pattern grid, an opacity of a pattern grid, a gradient of a pattern grid, a direction of a gradient included in a pattern grid, and/or a theme, among other examples. Additionally, or alternatively, the feature set may include one or more of the following features: an age of an anticipated user of a GUI, feedback from an anticipated user of a GUI, a geographic location of a client device of an anticipated user of a GUI, a type of client device used by an anticipated user of a GUI, an education level of an anticipated user of a GUI, a dexterity of an anticipated user of a GUI, and/or an eyesight of an anticipated user of a GUI, among other examples.

As shown by reference number 415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 420, the machine learning system may train a machine learning model 425a using the set of observations and using one or more machine learning algorithms, such as a regression algorithm, a decision tree algorithm, a neural network algorithm, a k-nearest neighbor algorithm, a support vector machine algorithm, or the like. For example, a neural network algorithm may evaluate characteristics of a demographic of anticipated users of a GUI in combination with a set of GUI design rules to determine a of measure of useability of the GUI for the demographic of anticipated users. In such a case, the neural network algorithm may further determine a degree of conformance to information and/or interface components of the GUI design rules, where the information and/or interface components are perceivable to the anticipated users. After training, the machine learning system may store the machine learning model as a trained machine learning model 425b to be used to analyze new observations.

As an example, the machine learning system may obtain training data for the set of observations based on user profiles provided to the machine learning system through different GUI design tools operating on different client devices.

As shown by reference number 430, the machine learning system may apply the trained machine learning model 425b to a new observation, such as by receiving a new observation and inputting the new observation to the trained machine learning model 425b. The machine learning system may apply the trained machine learning model 425b to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 425b may predict a position and an opacity of an image within a GUI (e.g., the target variable 415) for the new observation 405n (e.g., a GUI having a moderate usage rate) as shown by reference number 435. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, relocating the position of the image in a corner of the GUI. The first automated action may include, for example, generating a proposed GUI including the image in a corner of the GUI and the image having an opacity of approximately 85%.

In some implementations, the trained machine learning model 425b may classify (e.g., cluster) the new observation in a cluster (e.g., one of the clusters 450a-450c), as shown by reference number 440. The observations within a cluster may have a threshold degree of similarity. As an example, if the machine learning system classifies the new observation in a first cluster 405a (a moderate measure of useability in combination with non-conformance to one or more GUI design rules, among other examples) then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 425b may be re-trained (e.g., as shown by reference number 445) using feedback information. For example, feedback may be provided to the machine learning model. The feedback may be associated with actions performed based on the recommendations provided by the trained machine learning model 425b and/or automated actions performed, or caused, by the trained machine learning model 425b. In other words, the recommendations and/or actions output by the trained machine learning model 425b may be used as inputs to re-train the machine learning model (e.g., a feedback loop may be used to train and/or update the machine learning model). For example, the feedback information may include feedback received from on-line surveys provided to the anticipated users and/or feedback received by a user designing a GUI.

In this way, the machine learning system may apply a rigorous and automated process to recommending and generating GUIs, where such GUIs have a high degree of usability to the anticipated users and also conforms to GUI design rules. The machine learning system may enable recognition and/or identification of tens, hundreds, thousands, or millions of features and/or feature values for tens, hundreds, thousands, or millions of observations, thereby increasing accuracy and consistency and reducing delay associated with recommending and generating such GUIs relative to requiring computing resources to be allocated for tens, hundreds, or thousands of operators to manually recommend and generate such GUIs using the features or feature values.

As indicated above, FIG. 4 is provided as an example. Other examples may differ from what is described in connection with FIG. 4.

Figure 5:
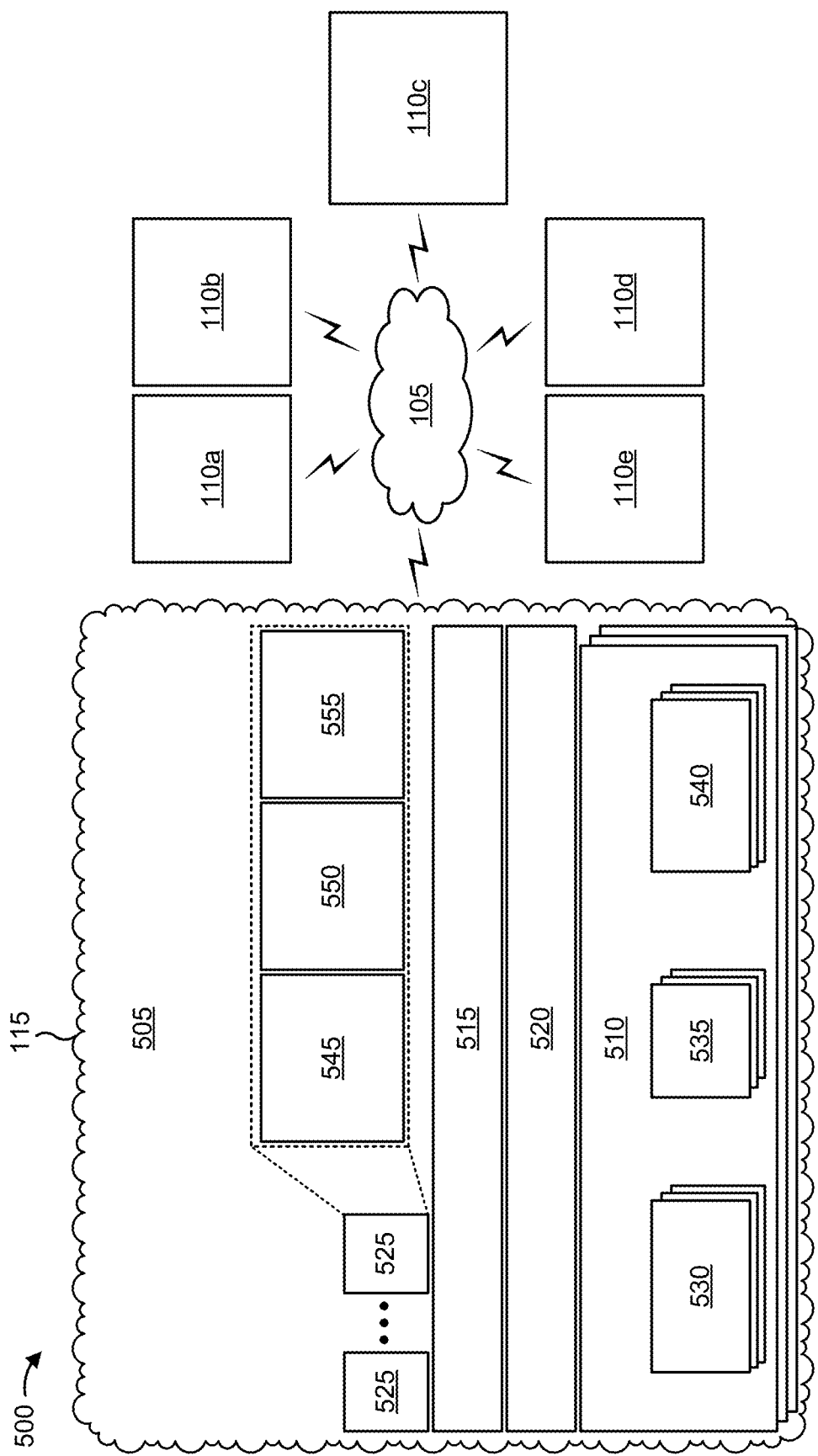
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include the GUI design management server 115, which may include one or more elements of and/or may execute within a cloud computing system 505 (e.g., a cloud environment). The cloud computing system 505 may include one or more elements 510-555, as described in more detail below. As further shown in FIG. 5, environment 500 may include the network 105, and user devices 110a-110e. Devices and/or elements of environment 500 may interconnect via wired connections and/or wireless connections.

The cloud computing system 505 may include computing hardware 510, a resource management component 515, a host operating system (OS) 520, and/or one or more virtual computing systems 525. The cloud computing system 505 may execute on, for example, an Amazon Web Services platform, a Microsoft Azure platform, or a Snowflake platform. The resource management component 515 may perform virtualization (e.g., abstraction) of computing hardware 510 to create the one or more virtual computing systems 525. Using virtualization, the resource management component 515 enables a single computing device (e.g., a computer or a server) to operate like multiple computing devices, such as by creating multiple isolated virtual computing systems 525 from computing hardware 510 of the single computing device. In this way, computing hardware 510 can operate more efficiently, with lower power consumption, higher reliability, higher availability, higher utilization, greater flexibility, and lower cost than using separate computing devices.

The computing hardware 510 may include hardware and corresponding resources from one or more computing devices. For example, computing hardware 510 may include hardware from a single computing device (e.g., a single server) or from multiple computing devices (e.g., multiple servers), such as multiple computing devices in one or more data centers. As shown, computing hardware 510 may include one or more processors 530, one or more memories 535, and/or one or more networking components 540. Examples of a processor, a memory, and a networking component (e.g., a communication component) are described elsewhere herein.

The resource management component 515 may include a virtualization application (e.g., executing on hardware, such as computing hardware 510) capable of virtualizing computing hardware 510 to start, stop, and/or manage one or more virtual computing systems 525. For example, the resource management component 515 may include a hypervisor (e.g., a bare-metal or Type 1 hypervisor, a hosted or Type 2 hypervisor, or another type of hypervisor) or a virtual machine monitor, such as when the virtual computing systems 525 are virtual machines 545. Additionally, or alternatively, the resource management component 515 may include a container manager, such as when the virtual computing systems 525 are containers 550. In some implementations, the resource management component 515 executes within and/or in coordination with a host operating system 520.

A virtual computing system 525 may include a virtual environment that enables cloud-based execution of operations and/or processes described herein using computing hardware 510. As shown, a virtual computing system 525 may include a virtual machine 545, a container 550, or a hybrid environment 555 that includes a virtual machine and a container, among other examples. A virtual computing system 525 may execute one or more applications using a file system that includes binary files, software libraries, and/or other resources required to execute applications on a guest operating system (e.g., within the virtual computing system 525) or the host operating system 520.

Although the GUI design management server 115 may include one or more elements 510-555 of the cloud computing system 505, may execute within the cloud computing system 505, and/or may be hosted within the cloud computing system 505, in some implementations, the GUI design management server 115 may not be cloud-based (e.g., may be implemented outside of a cloud computing system) or may be partially cloud-based. For example, the GUI design management server 115 may include one or more devices that are not part of the cloud computing system 505 and which may include a standalone server or another type of computing device. The GUI design management server 115 may perform one or more operations and/or processes described in more detail elsewhere herein.

The network 105 may include one or more wired and/or wireless networks. For example, the network 105 may include a cellular network (e.g., a 5G telecommunications network), a public land mobile network (PLMN), a local area network (LAN), a wide area network (WAN), a private network, the Internet, and/or a combination of these or other types of networks. The network 105 enables communication among the devices of the environment 500.

The user devices 110a-110e may each include one or more features of user device 110 as described in connection with FIG. 1. For example, each of the user devices 110a-110e may include the user interface 125 and/or the GUI design application 130.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of the environment 500 may perform one or more functions described as being performed by another set of devices of the environment 500.

Figure 6:
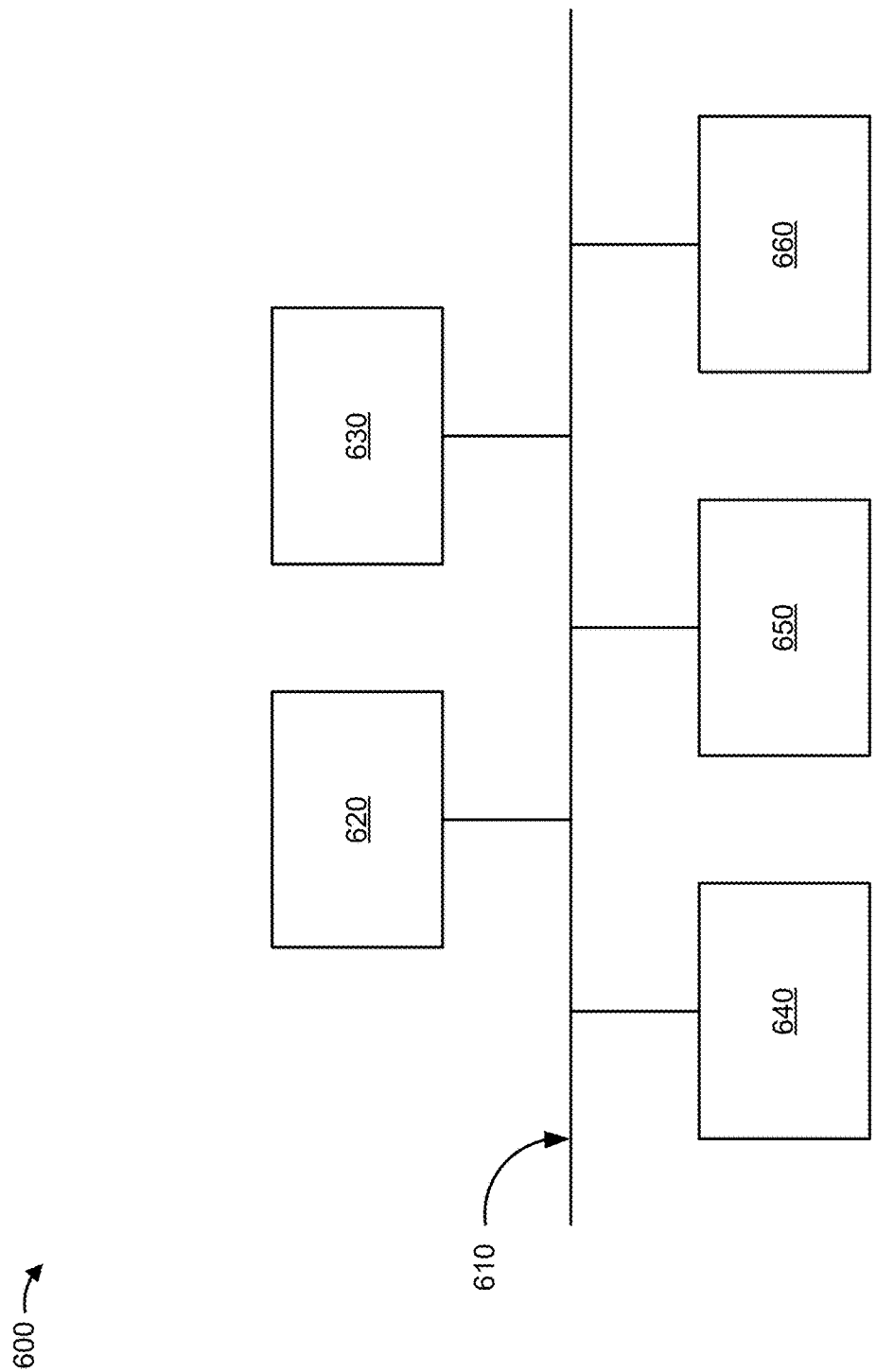
FIG. 6 is a diagram of example components of a device associated with generating a graphical user interface herein.

FIG. 6 is a diagram of example components of a device 600 associated with generating a GUI to conform with design rules. The device 600 may correspond to network 105, the user device 110, the GUI design management server 115, and/or one or more devices of the cloud computing system 505. In some implementations, network 105, the user device 110, the GUI design management server 115, and/or one or more devices of the cloud computing system 505 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device.

Figure 7:
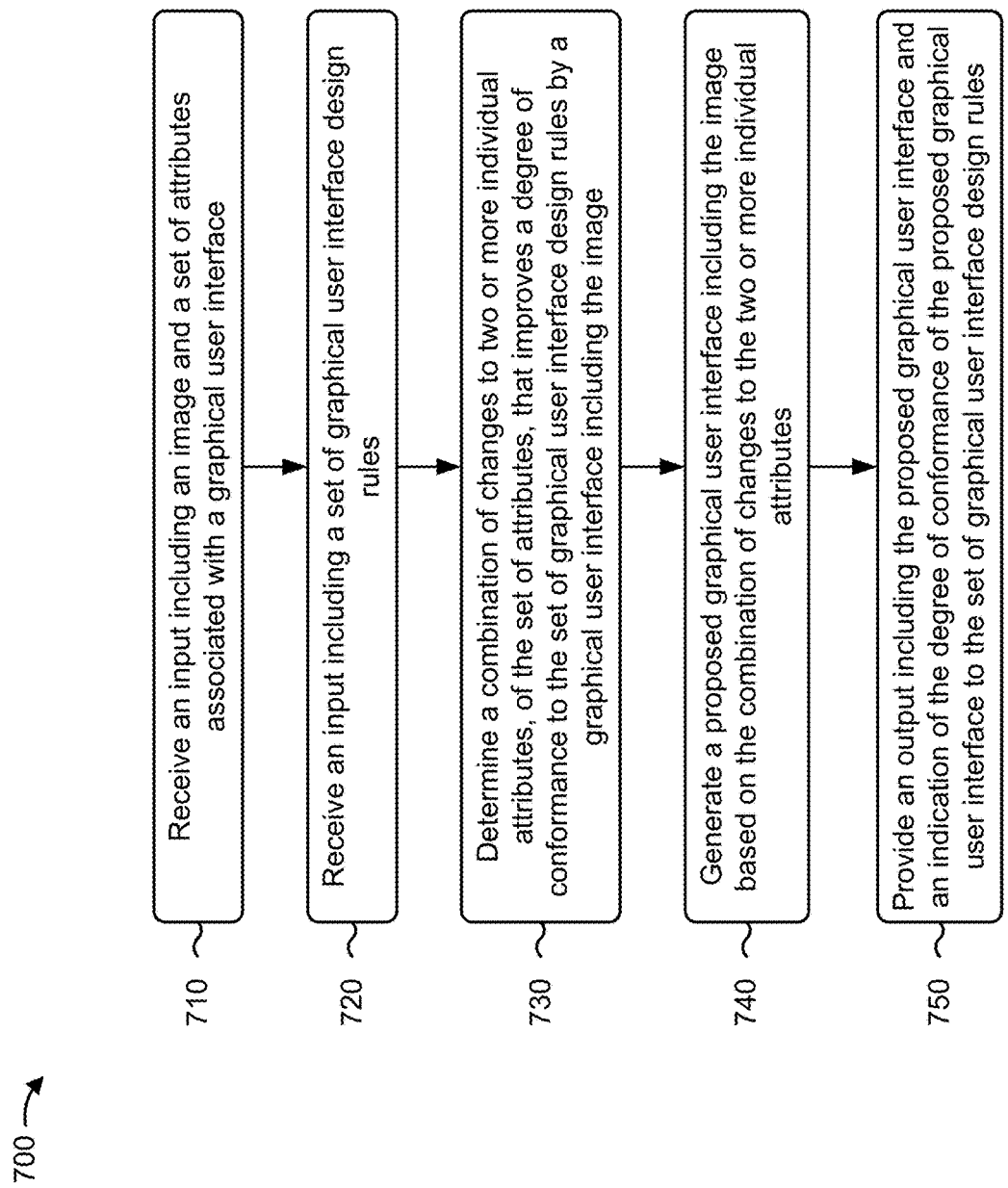
FIG. 7 is a flowchart of an example process associated with generating a graphical user interface as described herein.

FIG. 7 is a flowchart of an example process associated with generating a GUI to conform with design rules as described herein. In some implementations, one or more process blocks of FIG. 7 are performed by the GUI design management server 115 including the GUI conformance and useability application 135. In some implementations, one or more process blocks of FIG. 7 are performed by another device or a group of devices separate from or including the GUI design management server 115, such as the user device 110, the data source 120, the machine learning model 425*a*, and/or the cloud computing system 505. Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving an input including an image and a set of attributes associated with a GUI (block 710). For example, the GUI design management server 115 may receive an input (e.g., the input 225) including an image (e.g., the image 215) and a set of attributes (e.g., the attributes 220) associated with a GUI, as described above.

As further shown in FIG. 7, process 700 may include receiving an input including a set of GUI design rules (block 720). For example, the GUI design management server 115 may receive an input (e.g., the input 235) including a set of GUI design rules (e.g., the GUI design rules 140), as described above.

As further shown in FIG. 7, process 700 may include determining a combination of changes to two or more individual attributes, of the set of attributes, that improve a degree of conformance to the set of GUI design rules by a GUI including the image (block 730). For example, the GUI design management server 115 may determine a combination of changes to two or more individual attributes, of the set of attributes, that improves a degree of conformance (e.g., the degree of conformance 245) to the set of GUI design rules by a GUI including the image, as described above.

As further shown in FIG. 7, process 700 may include generating a proposed GUI including the image based on the combination of changes to the two or more individual attributes (block 740). For example, the GUI design management server 115 may generate a proposed GUI (e.g., the proposed GUI 240) including the image based on the combination of changes to the two or more individual attributes, as described above.

As further shown in FIG. 7, process 700 may include providing an output including the proposed GUI and an indication of the degree of conformance of the proposed GUI to the set of GUI design rules (block 750). For example, the GUI design management server 115 may provide an output (e.g., the output 250) including the proposed GUI and an indication of the degree of conformance of the proposed GUI to the set of GUI design rules, as described above.

Process 700 may include additional implementations, such as any single implementation or any combination of implementations described below and/or in connection with one or more other processes described elsewhere herein.

In a first implementation, receiving the input including the image and the set of attributes includes receiving a logo and an indication of a color associated with the logo.

In a second implementation, alone or in combination with the first implementation, determining the combination of changes to the two or more individual attributes includes determining the combination of changes based on a pattern guideline, a gradient guideline, a scaling guideline, and/or a position guideline.

In a third implementation, alone or in combination with one or more of the first and second implementations, receiving the input including the set of GUI design rules includes receiving a set of Web Content Accessibility Guidelines.

In a fourth implementation, alone or in combination with one or more of the first through third implementations, determining the combination of changes to the two or more individual attributes includes determining the combination of changes to the two or more individual attributes that improve a degree of conformance to information and interface components that are perceivable to a user of the GUI including the image.

In a fifth implementation, alone or in combination with one or more of the first through fourth implementations, determining the combination of changes to the two or more individual attributes that improves the degree of conformance to the information and interface components that are perceivable to a user of the GUI including the image includes determining the combination of changes based on a minimum contrast guideline, an enhanced contrast guideline, a use of color guideline, a visual presentation guideline, and/or an orientation guideline.

In a sixth implementation, alone or in combination with one or more of the first through fifth implementations, determining the combination of changes to the two or more individual attributes that improves the degree of conformance to the information and interface components that are perceivable to a user of the GUI including the image includes determining the combination of changes based on an images of text guideline, a resize text guideline, and/or a non-text contrast guideline.

In a seventh implementation, alone or in combination with one or more of the first through sixth implementations, the proposed GUI corresponds to a first example GUI and the method further includes generating a second example GUI based on originally received settings or values associated with the set of attributes included in the input, and providing an output including the second example GUI and an indication of an amount of difference in a degree of conformance between the first example GUI and the second example GUI.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

Some implementations described herein provide apparatuses and techniques related to graphical user interface design conformance and measure of useability. The apparatuses and techniques include a GUI design management server including a GUI design conformance and useability application. The GUI design management server may receive an input related to a design of a GUI, such as an image and one or more attributes related to the image. The GUI design management server may further receive another input including a set of GUI design rules and data related to anticipated users. Using the inputs, and in some cases a machine learning model, the design management server may generate one or more proposed GUIs having an increased degree in conformance to the GUI design rules and/or an increased measure of useability to the anticipated users of the GUI relative to GUI developed at the discretion of the web page designer.

In this way, a web page designer may efficiently design a GUI that is navigable and interpretable. In contrast to techniques relying on the web page designer designing the GUI at the web page designer's discretion, the apparatuses and techniques described herein may aid the web page designer to reduce a consumption of resources (e.g., computing resources and/or power resources) related to a user device and/or a server used to design the GUI. Additionally, or alternatively, because the GUI is designed with an increased degree in conformance to the GUI design rules and/or an increased measure of useability to the anticipated users of the GUI, the apparatuses described herein may reduce a consumption of resources related to a server that serves the GUI to a group of client devices, a network for communicating the GUI from the server to the group of client devices, and the group of client devices.

As described in greater detail above, some implementations described herein provide a method. The method includes receiving, by a device, an input including an image and a set of attributes associated with a GUI. The method includes receiving, by the device, an input including a set of GUI design rules. The method includes determining, by the device, a combination of changes to two or more individual attributes, of the set of attributes, that improve a degree of conformance to the set of GUI design rules by a GUI including the image. The method includes generating, by the device, a proposed GUI including the image based on the combination of changes to the two or more individual attributes. The method includes providing, by the device, an output including the proposed GUI and an indication of the degree of conformance of the proposed GUI to the set of GUI design rules.

As described in greater detail above, some implementations described herein provide a non-transitory computer-readable medium that stores a set of instructions. The set of instructions includes one or more instructions that, when executed by one or more processors of a device, cause the device to receive an input including an image and a set of attributes associated with a GUI, receive an input including a set of GUI design rules, and determine multiple combinations of changes to two or more individual attributes, of the set of attributes, to improve a degree of conformance to the set of GUI design rules by a GUI including the image. The set of instructions, when executed by the one or more processors, further cause the device to generate multiple example GUIs including the image based on the multiple combinations of changes to the two or more individual attributes and provide an output including the multiple example GUIs including the image.

As described in greater detail above, some implementations described herein provide a device. The device includes one or more memories. The device includes one or more processors, coupled to the one or more memories, configured to receive an input including an image and a set of attributes associated with a GUI, receive an input including a set of GUI design rules, provide the set of GUI design rules to a machine learning model to train the machine learning model, and determine, using the machine learning model, a combination of changes to two or more individual attributes, of the set of attributes, to improve a measure of useability of a GUI including the image. In some implementations, the combination of changes is based on the set of GUI design rules. The one or more processors, coupled to the one or more memories, are further configured to generate a proposed GUI including the image based on the combination of changes to the two or more individual attributes, and provide an output including the proposed GUI and an indication of a degree of conformance of the proposed GUI to the set of GUI design rules.

As used herein, the term "and/or," when used in connection with a plurality of items, is intended to cover each of the plurality of items alone and any and all combinations of the plurality of items. For example, "A and/or B" covers "A and B," "A and not B," and "B and not A."

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    receiving, by a device, an input including an image and a set of attributes associated with a graphical user interface;
    receiving, by the device, an input including a set of graphical user interface design rules;
    determining, by the device, a combination of changes to two or more individual attributes, of the set of attributes, that improves a degree of conformance to the set of graphical user interface design rules by a graphical user interface including the image;
    generating, by the device, multiple proposed graphical user interfaces including the image based on the combination of changes to the two or more individual attributes;
    determining, by the device, a ranking of the multiple proposed graphical user interfaces based on a degree of conformance of each of the multiple proposed graphical user interfaces to the set of graphical user interface design rules; and
    providing, by the device, an output including the multiple proposed graphical user interfaces in a sequence corresponding to the ranking.

2. The method of claim 1, wherein receiving the input including the image and the set of attributes comprises:
    receiving an indication of a logo and a color associated with the logo.

3. The method of claim 1, wherein determining the combination of changes to the two or more individual attributes comprises:
determining the combination of changes to the two or more individual attributes based on at least one of:
a pattern guideline,
a gradient guideline,
a scaling guideline, or
a position guideline.

4. The method of claim 1, wherein receiving the input including the set of graphical user interface design rules comprises:
receiving a set of Web Content Accessibility Guidelines.

5. The method of claim 1, wherein determining the combination of changes to the two or more individual attributes comprises:
determining the combination of changes to the two or more individual attributes that improve a degree of conformance to information and interface components that are perceivable to a user of the graphical user interface including the image.

6. The method of claim 5, wherein determining the combination of changes to the two or more individual attributes comprises:
determining the combination of changes to the two or more individual attributes based on at least one of:
a minimum contrast guideline,
an enhanced contrast guideline,
a use of color guideline,
a visual presentation guideline, or
an orientation guideline.

7. The method of claim 5, wherein determining the combination of changes to the two or more individual attributes comprises:
determining the combination of changes to the two or more individual attributes based on at least one of:
an images of text guideline,
a resize text guideline, or
a non-text contrast guideline.

8. The method of claim 1, wherein the multiple proposed graphical user interfaces includes a first proposed graphical user interface and a second proposed graphical user interface, wherein the second proposed graphical user interface is based on originally received settings or values associated with the set of attributes included in the input.

9. A non-transitory computer-readable medium storing a set of instructions, the set of instructions comprising:
one or more instructions that, when executed by one or more processors of a device, cause the device to:
receive an input including an image and a set of attributes associated with a graphical user interface;
receive an input including a set of graphical user interface design rules;
determine multiple combinations of changes to two or more individual attributes, of the set of attributes, to improve a degree of conformance to the set of graphical user interface design rules by a graphical user interface including the image;
generate multiple proposed graphical user interfaces including the image based on the multiple combinations of changes to the two or more individual attributes;
determine a ranking of the multiple proposed graphical user interfaces based on a degree of conformance of each of the multiple proposed graphical user interfaces to the set of graphical user interface design rules; and
provide an output including the multiple proposed graphical user interfaces in a sequence corresponding to the ranking.

10. The non-transitory computer-readable medium of claim 9, wherein the ranking is based on:
a weighting of conformance levels included in the set of graphical user interface design rules.

11. The non-transitory computer-readable medium of claim 9, wherein the one or more instructions, when executed by the one or more processors of the device, further cause the device to:
receive an indication of a selected proposed graphical user interface including the image from the multiple proposed graphical user interfaces including the image;
receive a change to an attribute of the selected proposed graphical user interface including the image;
determine a change in a degree of conformance to the set of graphical user interface design rules by the selected proposed graphical user interface based on the change to the attribute; and
provide an indication of the change in the degree of conformance.

12. The non-transitory computer-readable medium of claim 11, wherein the one or more instructions, when executed by the one or more processors, further cause the device to:
generate an updated proposed graphical user interface based on the change to the attribute; and
provide the updated proposed graphical user interface.

13. The non-transitory computer-readable medium of claim 12, wherein the change to the attribute of the selected proposed graphical user interface is related to at least one of:
a scale of a pattern grid,
a spacing of the pattern grid,
a rotation of the pattern grid,
an opacity of the pattern grid,
a gradient included in the pattern grid, or
a direction of the gradient included in the pattern grid.

14. A device, comprising:
one or more memories; and
one or more processors, coupled to the one or more memories, configured to:
receive an input including an image and a set of attributes associated with a graphical user interface;
receive an input including a set of graphical user interface design rules;
determine a combination of changes to two or more individual attributes, of the set of attributes, that improves a degree of conformance to the set of graphical user interface design rules by a graphical user interface including the image;
generate multiple proposed graphical user interfaces including the image based on the combination of changes to the two or more individual attributes;
determine a ranking of the multiple proposed graphical user interfaces based on a degree of conformance of each of the multiple proposed graphical user interfaces to the set of graphical user interface design rules; and
provide an output including the multiple proposed graphical user interfaces in a sequence corresponding to the ranking.

15. The device of claim 14, wherein the one or more processors, to receive the input including the image and the set of attributes, are configured to:
receive an indication of a logo and a color associated with the logo.

16. The device of claim 14, wherein the one or more processors, to determine the combination of changes to the two or more individual attributes, are configured to:
    determine the combination of changes to the two or more individual attributes based on at least one of:
        a pattern guideline,
        a gradient guideline,
        a scaling guideline, or
        a position guideline.

17. The device of claim 14, wherein the one or more processors, to receive the input including the set of graphical user interface design rules, are configured to:
    receive a set of Web Content Accessibility Guidelines.

18. The device of claim 14, wherein the one or more processors, to determine the combination of changes to the two or more individual attributes, are configured to:
    determine the combination of changes to the two or more individual attributes that improve a degree of conformance to information and interface components that are perceivable to a user of the graphical user interface including the image.

19. The device of claim 18, wherein the one or more processors, to determine the combination of changes to the two or more individual attributes, are configured to:
    determine the combination of changes to the two or more individual attributes based on at least one of:
        a minimum contrast guideline,
        an enhanced contrast guideline,
        a use of color guideline,
        a visual presentation guideline, or
        an orientation guideline.

20. The device of claim 18, wherein the one or more processors, to determine the combination of changes to the two or more individual attributes, are configured to:
    determine the combination of changes to the two or more individual attributes based on at least one of:
        an images of text guideline,
        a resize text guideline, or
        a non-text contrast guideline.

\* \* \* \* \*